United States Patent
Aga et al.

(10) Patent No.: US 6,694,225 B2
(45) Date of Patent: Feb. 17, 2004

(54) ROLLOVER DETERMINING APPARATUS AND METHODS

(75) Inventors: Masami Aga, Susono (JP); Makoto Sekizuka, Susono (JP); Shuichi Ishimoto, Toyota (JP); Motomi Iyoda, Seto (JP); Tomoki Nagao, Nagoya (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 71 days.

(21) Appl. No.: 10/020,418

(22) Filed: Dec. 18, 2001

(65) Prior Publication Data
US 2002/0087235 A1 Jul. 4, 2002

(30) Foreign Application Priority Data
Dec. 28, 2000 (JP) .................................. 2000-401609

(51) Int. Cl.⁷ .................................................. G05D 1/00
(52) U.S. Cl. ........................ 701/1; 701/45; 701/46; 180/282
(58) Field of Search ................. 701/1, 45, 46, 701/47; 180/282; 280/735; 340/429, 440, 443

(56) References Cited

U.S. PATENT DOCUMENTS 6,038,495 A    3/2000  Schiffmann ................... 701/1
6,438,463 B1 * 8/2002  Tobaru et al. ................. 701/1
2002/0173882 A1 * 11/2002 Tobaru et al. ................. 701/1

FOREIGN PATENT DOCUMENTS

| DE | 197 44 083 | 4/1999 |
| EP | 0 965 502 | 12/1999 |
| JP | A-11-258260 | 9/1999 |
| JP | 2000-503278 A | 3/2000 |
| JP | 2000-510407 A | 8/2000 |
| JP | A-2001-260782 | 9/2001 |
| WO | WO 00 58133 A | 10/2000 |

* cited by examiner

Primary Examiner—Marthe Y. Marc-Coleman
(74) Attorney, Agent, or Firm—Oliff & Berridge, PLC

(57) ABSTRACT

A rollover determining apparatus and methods for determining whether a vehicle is about to roll over distinguishes a type of rollover that is likely to occur to the vehicle based on the lateral acceleration of the vehicle and the roll angle of the vehicle. Moreover, a determination is made whether the state of the vehicle indicated by a first quantity corresponding to the distinguished type of rollover is in a rollover region determined by a predetermined threshold line. The apparatus and methods can also change the threshold line in accordance with the magnitude of second quantity that is different from the first quantity and that corresponds to the distinguished type of rollover.

23 Claims, 14 Drawing Sheets

MAP A

FLIP-OVER
(REGION A)

TURN-OVER
(REGION B)

TRIP-OVER
(REGION C)

MAP B

MAP C

ROLLOVER DETERMINING APPARATUS AND METHODS

INCORPORATION BY REFERENCE

The disclosure of Japanese Patent Application No. 2000-401609 filed on Dec. 28, 2000, including the specification, drawings and abstract is incorporated herein by reference in its entirety.

BACKGROUND OF THE INVENTION

1. Field of Invention

The invention relates to a rollover determining apparatus and methods for determining whether a vehicle is about to roll over.

2. Description of Related Art

A rollover determining apparatus designed to determine whether a vehicle is about to roll over based on the roll angle and the roll rate of the vehicle is conventionally known. It is also known that as a vehicle turns a comer, an occupant is likely to shift closer to a side portion of the vehicle. Therefore, if a vehicle rolls over during the turn, the deployment space for an airbag installed in a side portion of the vehicle may be reduced. Thus, an apparatus disclosed in Japanese Patent Application Laid-Open No. 2000-9599 determines whether the vehicle is turning based on the steering angle. When the vehicle is not turning, the apparatus determines whether the vehicle is about to roll over based on the roll angle and the roll rate. When the vehicle is turning, the apparatus determines in an earlier period whether the vehicle is about to roll over, factoring in the lateral acceleration.

The rollover of a vehicle includes different types of rollovers like, for example, a flip-over due to a run upon an inclined surface and the like, as well as a turn-over due to sharp turning of the vehicle. Therefore, the determination regarding whether the vehicle is about to roll over based only on whether the vehicle is turning, as in the conventional technology, is not sufficient to make a precise determination of whether various types of rollovers will occur.

SUMMARY OF THE INVENTION

Accordingly, it is an object of the invention to appropriately distinguish types of rollovers, and to improve the precision in the rollover determination in accordance with the distinguished types of rollovers.

One aspect of the invention is a rollover determining apparatus and methods for determining whether a vehicle is about to roll over. The apparatus includes a controller that distinguishes a type of rollover that is likely to occur to the vehicle based on a physical quantity that indicates a state of the vehicle, and that determines that the vehicle is about to rollover if the state of the vehicle meets a determination condition corresponding to the type of rollover distinguished.

This rollover determining apparatus is able to distinguish the type of rollover that is likely to occur to the vehicle based on the physical quantity that indicates the state of the vehicle. Furthermore, the apparatus determines whether a rollover is about to occur based on the determination condition that is appropriate (that exhibits a characteristic change) in accordance with the type of rollover distinguished. Therefore, it becomes possible to more precisely determine whether a rollover is about to occur.

Specifically, the rollover determining apparatus may determine whether one of a flip-over, turn-over and trip-over will occur to the vehicle based on the lateral acceleration and the roll angle of the vehicle.

Furthermore, the controller may determine whether the state of the vehicle, which is indicated by a predetermined physical quantity that corresponds to the type of distinguished rollover, is in a rollover region that is determined by a predetermined threshold line, and may change the threshold line in accordance with a magnitude of another physical quantity that is different from the predetermined quantity and that corresponds to the type of distinguished rollover.

Thus, after appropriately distinguishing the type of rollover, the rollover determining apparatus appropriately stores physical quantities that appear at the time of a rollover in accordance with the characteristics of the type of the rollover. Using these physical quantities, the state of the vehicle is determined. Then, a rollover region is indicated beforehand by a predetermined threshold line. Therefore, it is possible to appropriately determine whether the vehicle is about to roll over. The threshold line is changed by a physical quantity that is different from the aforementioned physical quantity. Therefore, it becomes possible to more precisely determine whether the vehicle is about to roll over.

According to a further aspect of the invention, a rollover determining apparatus and method determines whether the vehicle is about to roll over. The apparatus includes a lateral acceleration detector that detects and outputs a lateral acceleration of the vehicle. Furthermore, a roll rate detector detects a roll rate of the vehicle, a first low-pass filter is connected to the lateral acceleration detector and passes a frequency that is at most a first cutoff frequency, and a second low-pass filter is connected to the lateral acceleration detector and passes a frequency that is at most a second cutoff frequency that is higher than the first cutoff frequency. Finally, a controller can determine that the vehicle is about to roll over if the following criteria occurs: (a) a state of the vehicle indicated by the lateral acceleration filtered by the first low-pass filter and a roll rate of the vehicle detected enters a rollover region determined by a first threshold line that prescribes a relationship between the lateral acceleration and the roll rate where the lateral acceleration filtered by the second low-pass filter is at most a predetermined threshold; and (b) if the state of the vehicle indicated by the lateral acceleration filtered by the second low-pass filter and the roll rate of the vehicle detected enters a rollover region determined by a second threshold line prescribing a relationship between the lateral acceleration and the roll rate where the lateral acceleration filtered by the second low-pass filter is greater than the predetermined threshold.

The controller may determine whether one of a flip-over, a turn-over and a trip-over is the type of rollover that will occur to the vehicle. If the type of rollover is determined to be a trip-over, the controller performs an additional rollover determination.

As mentioned above, the trip-over can occur when a vehicle skids on dirt or a pavement surface and then rolls over due to, for example, accumulation of sand, earth, etc., on the outer side of a wheel, or in which a vehicle rolls over due to impingement of a wheel on a curb or the like. The trip-over needs to be distinguished from the case where an object impacts on a side portion of a vehicle (generally-termed side collision). Where a trip-over occurs in which the vehicle rolls over due to an impingement of a wheel on a curb or the like, and where an object impacts a side portion of the vehicle, a signal with a relatively high frequency and a great amplitude appears in the output of the lateral acceleration detector (lateral acceleration sensor). In contrast, when the vehicle rolls over skidding on dirt or a pavement surface, such a signal rarely appears.

To classify such signals having relatively high frequencies into two types, the first cutoff frequency and the second cutoff frequency that is higher than the first cutoff frequency are set. A lateral acceleration with a relatively high frequency is detected, and is classified with a threshold value so that the threshold line is changed. Therefore, a trip-over where the vehicle rolls over skidding on dirt or a pavement surface can be determined in an early period. It also becomes possible to discriminate between a trip-over caused by an impingement of a wheel on a curb or the like and an impact of an object upon a side portion of the vehicle.

A further aspect of the invention provides a rollover determining method for determining whether a vehicle is about to roll over. The method includes the steps of: (a) distinguishing a type of rollover that is likely to occur to the vehicle based on a lateral acceleration of the vehicle and a roll angle of the vehicle; (b) determining whether the state of the vehicle indicated by a predetermined physical quantity corresponding to the type of distinguished rollover is in a rollover region determined by a predetermined threshold line; and (c) changing the threshold line in accordance with a magnitude of another physical quantity that is different from the predetermined physical quantity and that corresponds to the type of distinguished rollover.

According to this determining method, a type of rollover that is likely to occur to the vehicle can be distinguished based on the lateral acceleration of the vehicle and the roll angle of the vehicle, in the process of determining whether a rollover is about to occur. Furthermore, it is determined whether a rollover is about to occur based on a determination condition that is appropriate (that exhibits a characteristic change) and that corresponds to the type of distinguished rollover. Therefore, it becomes possible to appropriately determine whether a rollover is about to occur.

A further aspect of the invention provides a rollover determining method for determining whether the vehicle is about to roll over, which includes the steps of: (a) detecting a lateral acceleration of the vehicle; (b) detecting a roll rate of the vehicle; (c) acquiring a waveform of a first lateral acceleration formed by a frequency that is at most a first predetermined frequency, from a waveform of the lateral acceleration of the vehicle detected; (d) acquiring a waveform of a second lateral acceleration formed by a frequency that is at most a second predetermined frequency that is higher than the first predetermined frequency, from the waveform of the lateral acceleration of the vehicle detected; and (e) determining that the vehicle is about to roll over if a state of the vehicle enters a rollover region determined by a first threshold line prescribing a relationship between the first lateral acceleration and the roll rate in a case where the second lateral acceleration is at most a predetermined threshold, or determining that the vehicle is about to roll over if the state of the vehicle enters a rollover region determined by a second threshold line prescribing a relationship between the second lateral acceleration and the roll rate in a case where the second lateral acceleration is greater than the predetermined threshold.

According to this method, a trip-over in which the vehicle rolls over skidding on dirt or a pavement surface can be determined in an early period. It also becomes possible to distinguish between a trip-over caused by an impingement of a wheel on a curb or the like and an impact of an object upon a side portion of the vehicle.

BRIEF DESCRIPTION OF THE DRAWINGS

The above and other objects, features, advantages, technical and industrial significance of this invention will be better understood by reading the following detailed description of preferred embodiments of the invention, when considered in connection with the accompanying drawings, in which.

DETAILED DESCRIPTION OF PREFERRED EMBODIMENTS

In the following description and the accompanying drawings, the present invention will be described in more detail in terms of preferred embodiments.

The rollover determining apparatus also functions as an occupant protecting apparatus (a control apparatus of the occupant protecting apparatus) such as an airbag control apparatus, a pre-tensioner control apparatus, etc.

Figure 1:
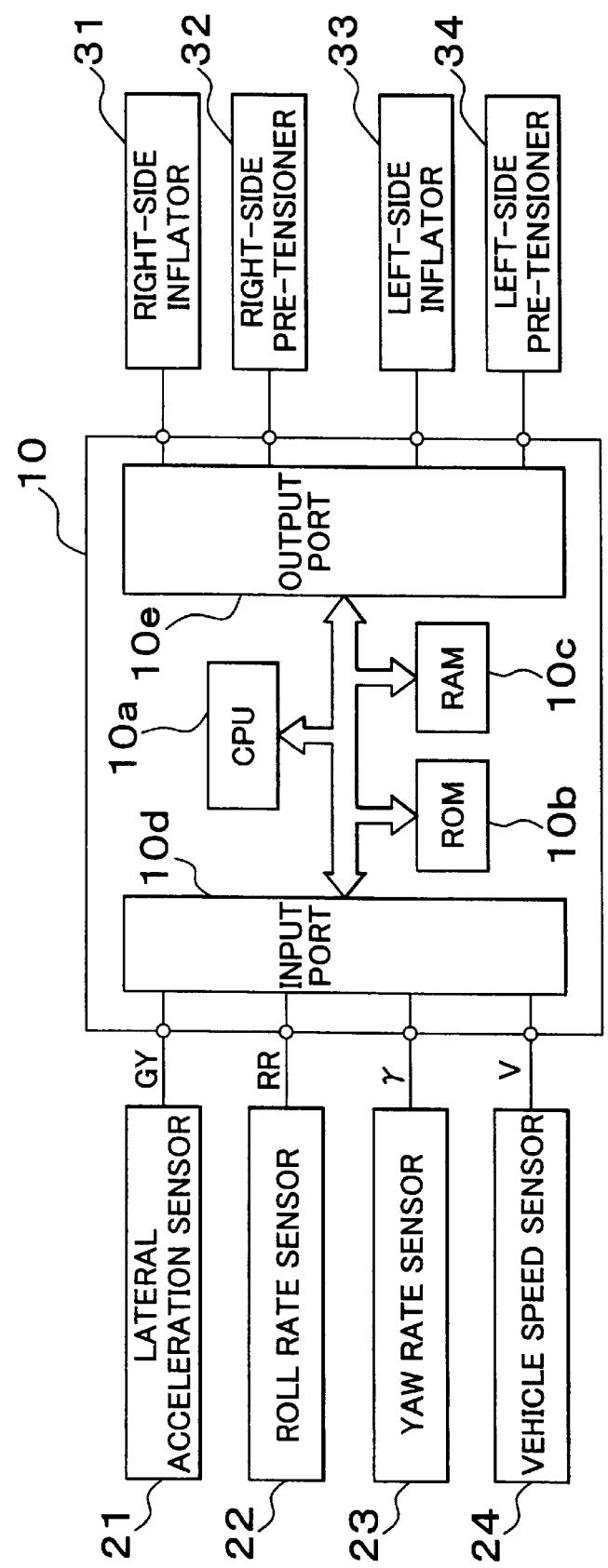
FIG. 1 is a block diagram schematically illustrating a rollover determining apparatus in accordance with a first embodiment of the invention.

FIG. 1 is a block diagram schematically illustrating the rollover determining apparatus. The rollover determining apparatus has an electric control unit 10. The electric control unit 10 is formed as a microcomputer that includes a CPU 10a, a ROM 10b, a RAM 10c, an input port 10d, an output port 10e, etc. which are interconnected via a bus. The CPU 10a executes programs stored in the ROM 10b using a temporary storage function of the RAM 10c.

Connected to the input port 10d of the electric control unit 10 are a lateral acceleration sensor 21, a roll rate sensor 22, a yaw rate sensor 23, and a vehicle speed sensor 24. Detection signals from these sensors are inputted to the CPU 10a. Connected to the output port 10e of the electric control unit 10 are a right-side inflator 31 provided at a right side of the vehicle, a right-side pre-tensioner 32 provided at the right side of the vehicle, a left-side inflator 33 provided at a left side of the vehicle, and a left-side pre-tensioner 34 provided at the left side of the vehicle. The CPU 10a supplies predetermined drive signals to these pre-tensioners.

Figure 2:
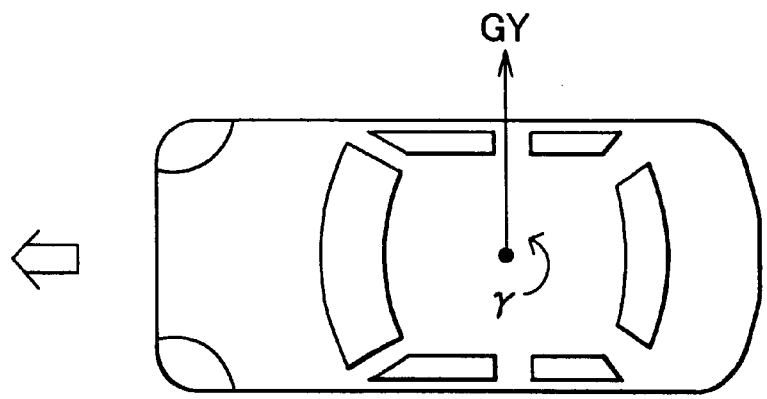
FIG. 2 is a plan view of a vehicle for illustrating the direction of detection of one embodiment of a lateral acceleration sensor.
Figure 3:
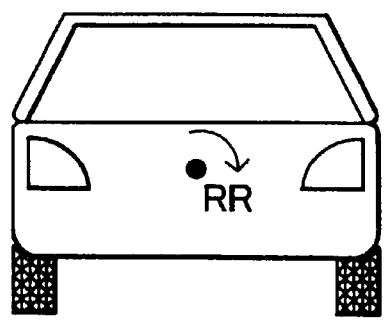
FIG. 3 is a front elevation of the vehicle for illustrating the direction of detection of one embodiment of a roll rate sensor.

The lateral acceleration sensor 21 detects the lateral acceleration GY of the vehicle (vehicle body) in the right-left directions with respect to the vehicle as indicated in FIG. 2. More specifically, the sensor 21 detects the acceleration in the rightward direction as a positive value. The roll rate sensor 22 detects the rotational angular speed of the vehicle about an axis (rolling axis) extending longitudinally through the center of gravity of the vehicle, that is, the roll rate RR, with the positive direction being defined as the clockwise direction viewed from forward of the vehicle, as indicated in FIG. 3. The yaw rate sensor 23 detects the rotational angular speed of the vehicle about an axis extending vertically with respect to the vehicle through the center of gravity of the vehicle, as indicated in FIG. 2. The vehicle speed sensor 24 detects the speed of vehicle (vehicle speed) V.

Figure 4:
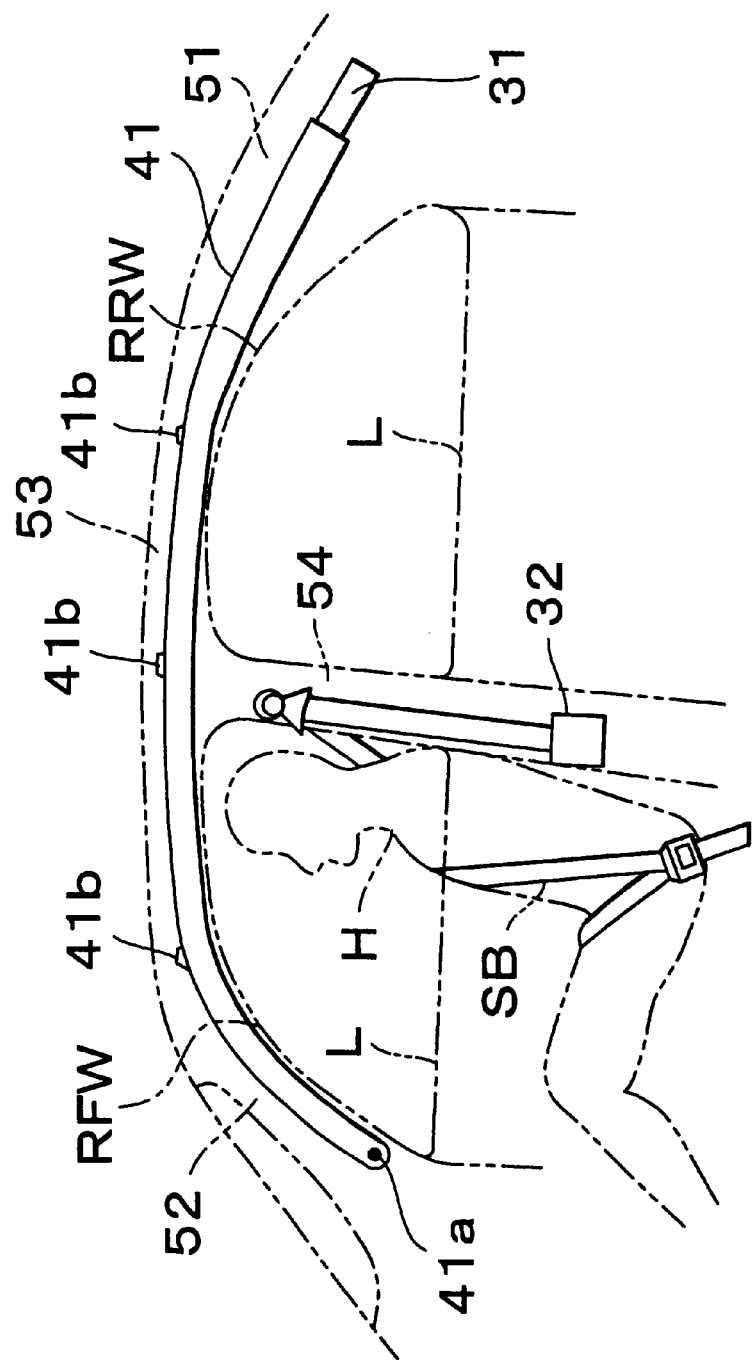
FIG. 4 is a side view of an airbag that is deployed by one embodiment of the rollover determining apparatus.

The right-side inflator 31 is mounted on a quarter pillar 51 as shown in FIG. 4. The right-side inflator 31 jets gas toward a right-side airbag 41 to deploy the right-side airbag 41 when a squib (not shown) receives a drive (ignition) signal from the electric control unit 10 illustrated in FIG. 1.

The right-side airbag 41 shown in FIG. 4 is attached at a forward end mounting portion 41a to a front pillar 52 of the vehicle body, and is also attached at various mounting portions 41b to a roof ride rail 53 of the vehicle body. The right-side airbag 41, when deployed, inflates to below (or adjacent to) a door belt line L with a predetermined tension maintained, and covers substantially the entire surfaces of a right-side front window RFW and a right-side rear window RRW, so as to prevent the body of an occupant H from shifting rightward with respect to the vehicle as shown in FIG. 5.

Figure 5:
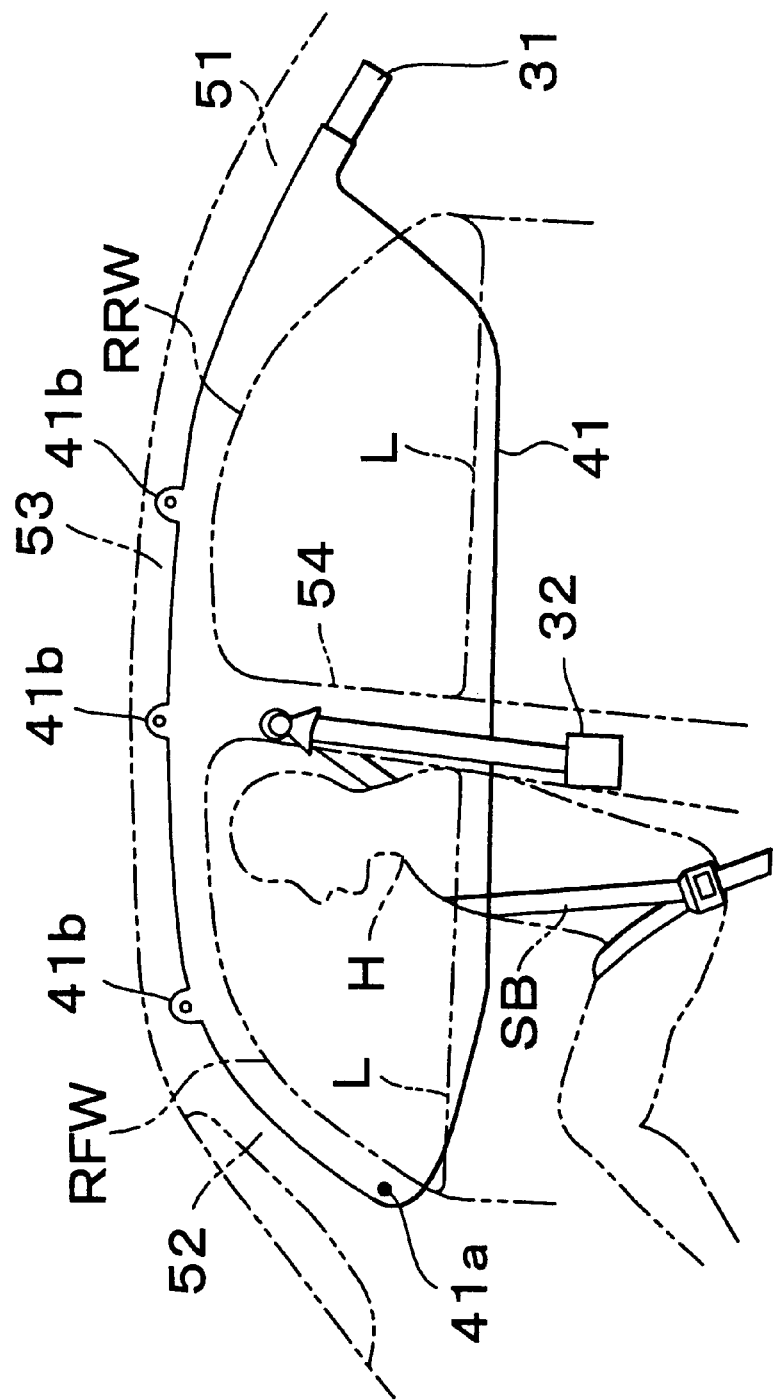
FIG. 5 is a side view of the airbag illustrating an inflated deployed state.

The right-side pre-tensioner 32 is mounted in a lower portion of a center pillar 54 as shown in FIGS. 4 and 5. Upon receiving a drive signal from the electric control unit 10 illustrated in FIG. 1, the right-side pre-tensioner 32 winds up a seatbelt SB to eliminate slack from the seatbelt SB in a short time.

The left-side inflator 33 and a left-side airbag (not shown) deployed by the left-side inflator 33 are substantially the same as the right-side inflator 31 and the right-side airbag 41, respectively, and will not be further described. Likewise, the left-side pre-tensioner 34 is substantially the same as the right-side pre-tensioner 32, and will not be further described.

The right-side inflator 31, the right-side airbag 41, the right-side pre-tensioner 32, the left-side inflator 33, the left-side airbag, and the left-side pre-tensioner 34 form portions of an occupant protecting apparatus.

Figure 12:
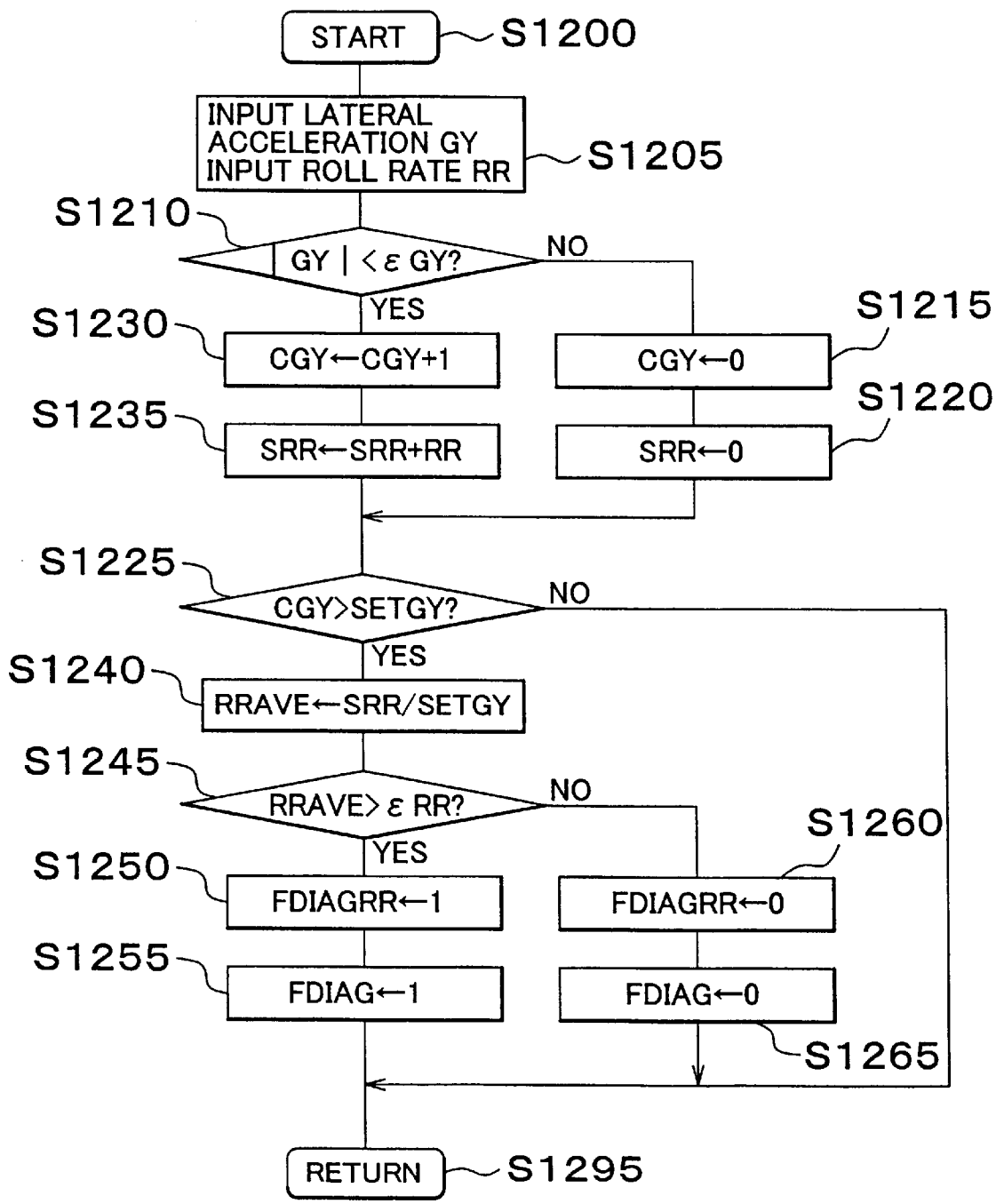
FIG. 12 is a flowchart illustrating one embodiment of a program executed by the CPU to determine whether the roll rate sensor has an abnormality.

Operation of the rollover determining apparatus having the above-described construction will be described. The CPU 10a executes a program (routine) illustrated by the flowchart of FIG. 6 at every elapse of a predetermined time. Therefore, every time a predetermined timing is reached, the CPU 10a starts processing at step 600 hereinafter, referred to as "S600"; similar abbreviation applied to other steps). Subsequently in S605, the CPU 10a determines whether the value of a sensor failure flag FDIAG is "1". The sensor failure flag FDIAG, when having the value "0", indicates that the lateral acceleration sensor 21 and the roll rate sensor 22 are normal, and when having the value "1", indicates that at least one of the lateral acceleration sensor 21 and the roll rate sensor 22 is abnormal. The value of the sensor failure flag FDIAG is changed through execution of a program illustrated in FIGS. 12 and 13 as described below.

Assuming that one of the lateral acceleration sensor 21 and the roll rate sensor 22 is abnormal, the sensor failure flag FDIAG has the value "1". Therefore, the determination in S605 is "YES", and the process proceeds to S695, in which the present routine ends. Thus, if one of the lateral acceleration sensor 21 or the roll rate sensor 22 has an abnormality, the determination regarding a rollover is not executed.

Conversely, if both the lateral acceleration sensor 21 and the roll rate sensor 22 are normal, the value of the sensor failure flag FDIAG is "0". Therefore, the CPU 10a makes a negative determination ("NO") in S605, and then proceeds to S610. In S610, the CPU 10a reads the lateral acceleration GY, the roll rate RR, the yaw rate $\gamma$, and the vehicle speed V based on the detection signals from the lateral acceleration sensor 21, the roll rate sensor 22, the yaw rate sensor 23, and the vehicle speed sensor 24.

Subsequently in S615, the CPU 10a determines a roll angle RA, an acceleration KG caused by a cant (road surface inclination), and a rate of change in lateral acceleration GYA as in mathematical expressions shown in S615 in FIG. 6. That is, the CPU 10a determines the roll angle RA through time integration of the roll rate RR, and determines the cant-based acceleration KG by subtracting the product of the yaw rate $\gamma$ and the vehicle speed V from the lateral acceleration GY, and determines the lateral acceleration change rate GYA through time differentiation of the lateral acceleration GY. The initial value of the roll angle RA is set to "0" when an ignition switch (not shown) of the vehicle is changed from an off-state to an on-state (when the vehicle is turned on).

The cant-based acceleration KG will be further described. Since the lateral acceleration sensor 21 is designed to detect the acceleration that occurs in horizontal lateral directions with respect to the vehicle, the output GY of the lateral acceleration sensor 21 is affected by the gravitational acceleration if the vehicle is on an inclined surface. Given an amount KG of effect of the gravitational acceleration (i.e., the acceleration caused by the cant) and a centrifugal force Q on the vehicle, Equation 1 holds.

$$GY = KG + Q \qquad \text{Equation 1}$$

Since the centrifugal force Q on the vehicle is the product of the vehicle speed V and the yaw rate $\gamma$, equation 1 can be rewritten into Equation 2 below. Therefore, the CPU 10a is able to determine the cant-based acceleration KG in accordance with Equation 2.

$$KG = Gy - \gamma \times V \quad \text{Equation 2}$$

Subsequently in S620, the CPU 10a determines which region in a mode discrimination map indicated in FIG. 7 contains a present state of the vehicle (a point determined by the lateral acceleration GY and the roll angle RA). The determination is based on the lateral acceleration GY and the roll angle RA, which are physical quantities indicating the present state of the vehicle, and the mode discrimination map, in which regions A to C are defined with reference to the abscissa axis indicating the lateral acceleration GY and the ordinate axis indicating the roll angle RA. Then, the CPU 10a determines the type of rollover as described below.

Figure 7:
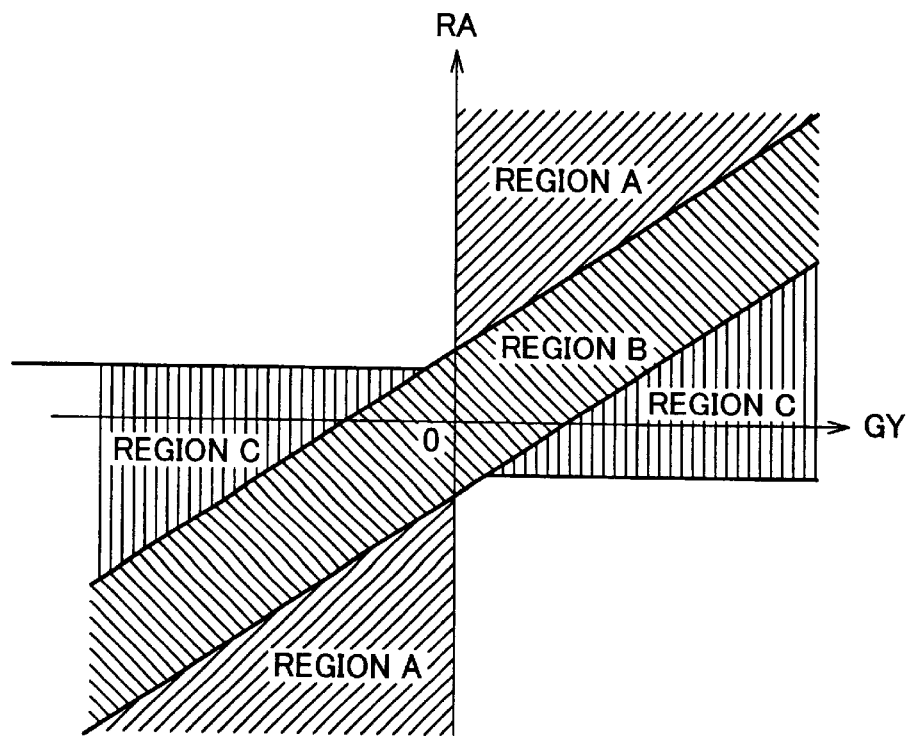
FIG. 7 is one embodiment of a map which is referred to when the CPU shown distinguishes a type of rollover.
Figure 8:
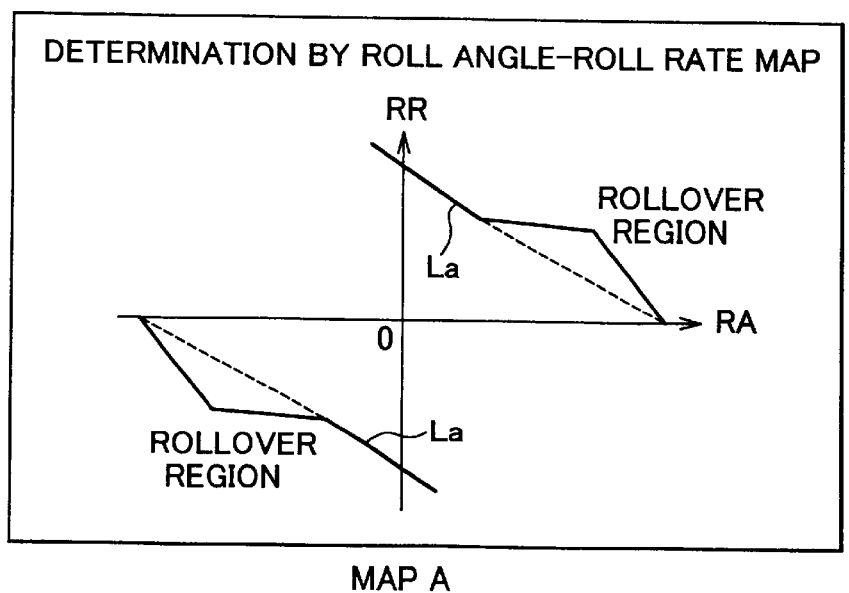
FIG. 8 is another embodiment of a map which is referred to when the CPU determines whether a rollover is about to occur.

If it is assumed that the magnitude of the lateral acceleration GY is relatively small and the magnitude of the roll angle RA is relatively great, and the state of operation of the vehicle exists in the region A in FIG. 7. In this case, the CPU 10a proceeds to S625, in which the CPU 10a determines whether the vehicle is about to roll over based on a map A indicated in FIG. 8.

In the map A, a two-dimensional region based on the roll angle RA and the roll rate RR is divided by threshold lines La prescribing a relationship between the roll angle RA and the roll rate RR. Of the divided regions, the regions that do not contain the point of origin are defined as rollover regions. The CPU 10a determines whether the vehicle is about to roll over by determining whether the state of the vehicle indicated by the roll angle RA and the roll rate RR is in either one of the rollover regions. If the cant-based acceleration KG calculated in S615 is greater than a predetermined value (e.g., 5 m/s$^2$), the threshold lines La are made closer to the point of origin so as to expand the rollover regions as indicated by broken lines in FIG. 8.

If the CPU 10a determines that the state of the vehicle indicated by the actual roll angle RA and the actual roll rate RR is in a rollover region, the process proceeds to S640. In S640, the occupant protecting apparatus is actuated by supplying drive signals to the inflator and the pre-tensioner on the rollover side. In other words, the right-side inflator 31 and the right-side pre-tensioner 32, or the left-side inflator 33 and the left-side pre-tensioner 34 are actuated. After that, the process proceeds to S695, in which the CPU 10a temporarily ends the routine. Conversely, if it is determined that the state of the vehicle is outside the rollover regions, the CPU 10a directly goes to S695, in which the CPU 10a temporarily ends the routine.

Figure 9A:
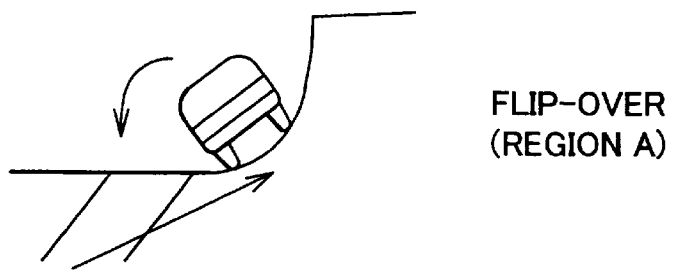
FIG. 9A is a diagram illustrating one state of a flip-over among the rollovers of the vehicle.

Thus, if the magnitude of the lateral acceleration GY is relatively small and the magnitude of the roll angle RA is relatively great, i.e., if it is determined that the state of the vehicle is in either one of the regions A in the mode discrimination map of FIG. 7, there is a high possibility of the vehicle rolling over due to a run on a cant as shown in FIG. 9A. This fashion of rollover is termed "flip-over." Here, the roll rate RR and the roll angle RA exhibit great changes in an earlier period than the lateral acceleration GY according to experiments. Therefore, the roll rate RR and the roll angle RA are adopted as physical quantities for rollover determination. Furthermore, in this case, if the roll rate RR and the roll angle RA are fixed, the vehicle becomes more likely to roll over with increases in the cant-based acceleration KG, i.e., the inclination angle of the cant. Therefore, in the rollover determination using the map A, the precision of the rollover determination can be improved by changing the threshold lines La as described above in accordance with the magnitude of the cant-based acceleration KG.

Figure 10:
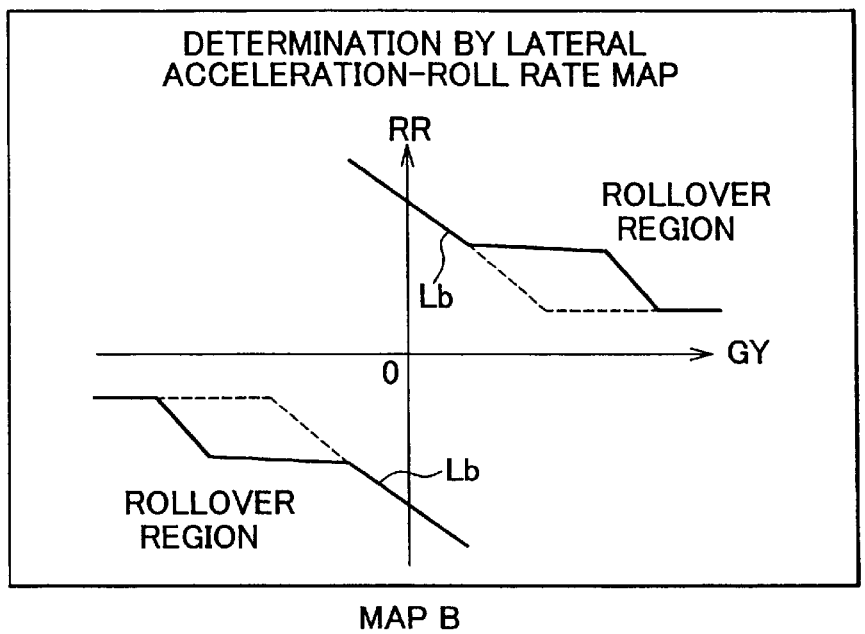
FIG. 10 is another embodiment of a map which is referred to when the CPU determines whether a rollover is about to occur.

If the actual lateral acceleration GY and the actual roll angle RA are substantially in proportion to each other, the state of the vehicle is in the region B in FIG. 7. Here, the CPU 10a goes from S620 to S630, in which the CPU 10a determines whether the vehicle is about to roll over based on a map B indicated in FIG. 10.

In the map B, a two-dimensional region based on the lateral acceleration GY and the roll rate RR is divided by threshold lines Lb prescribing a relationship between the lateral acceleration GY and the roll rate RR. Of the divided regions, the regions that do not contain the point of origin are defined as rollover regions. The CPU 10a determines whether the vehicle is about to roll over by determining whether the state of the vehicle indicated by the lateral acceleration GY and the roll rate RR is in either one of the rollover regions. If the yaw rate $\gamma$ read in S610 is greater than a predetermined value, e.g., 10 deg/s, the threshold lines Lb are made closer to the point of origin so as to expand the rollover regions as indicated by broken lines in FIG. 10.

If the CPU 10a determines that the state of the vehicle indicated by the actual lateral acceleration GY and the actual roll rate RR is in a rollover region, the process proceeds to from S630 to S640. In S640, the rollover-side occupant protecting apparatus is actuated. Subsequently in S695, the CPU 10a temporarily ends the routine. Conversely, if it is determined that the state of the vehicle is outside the rollover regions, the CPU 10a directly goes to S695, in which the CPU 10a temporarily ends the routine.

Figure 9B:
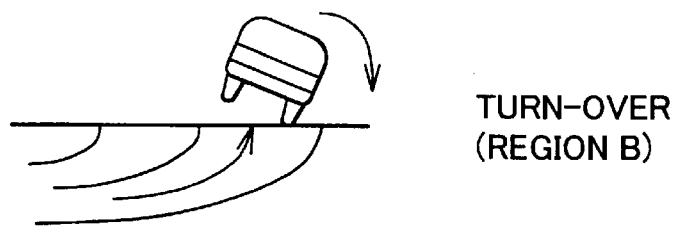
FIG. 9B is a diagram illustrating one state of a turnover among the rollovers of the vehicle.

Thus, if the actual lateral acceleration GY and the actual roll angle RA are substantially proportional to each other, i.e., if it is determined that the state of the vehicle is in the region B in the mode discrimination map of FIG. 7, there is a high possibility of the vehicle rolling over due to a sharp turn as shown in FIG. 9B. This fashion of rollover is termed "turn-over." Here, the lateral acceleration GY and the roll rate RR exhibit great changes in an earlier period than the roll angle RA according to experiments. Therefore, the lateral acceleration GY and the roll rate RR are adopted as physical quantities for rollover determination. Furthermore, in this case, if the lateral acceleration GY and the roll rate RR are fixed, the vehicle becomes more likely to roll over with increases in the yaw rate $\gamma$. Therefore, in the rollover determination using the map B, the precision of the rollover determination can be improved by changing the threshold lines Lb as described above in accordance with the magnitude of the yaw rate $\gamma$.

If the lateral acceleration GY is relatively great while the roll angle RA is relatively small, the state of the vehicle is in the region C in FIG. 7. In this case, the CPU 10a proceeds from S620 to S635, in which the CPU 10a determines whether the vehicle is about to roll over based on a map C indicated in FIG. 11.

In the map C, a two-dimensional region based on the lateral acceleration GY and the roll rate RR is divided by threshold lines (first threshold lines) Lc1 prescribing a relationship between the lateral acceleration GY and the roll rate RR. Of the divided regions, the regions that do not contain the point of origin are defined as rollover regions. The CPU 10a determines whether the vehicle is about to roll over by determining whether the state of the vehicle indicated by the lateral acceleration GY and the roll rate RR is in a rollover region. If the lateral acceleration change rate GYA calculated in S615 is greater than a predetermined value, the threshold lines Lc1 are changed to threshold lines Lc2 (second threshold lines) so as to reduce the rollover regions in size.

If the CPU 10a determines that the state of the vehicle indicated by the actual lateral acceleration GY and the actual roll rate RR is in a rollover region, the process proceeds to from S635 to S640. In S640, the rollover-side occupant protecting apparatus is actuated. Subsequently in S695, the CPU 10a temporarily ends the routine. Conversely, if it is determined that the state of the vehicle is outside the rollover regions, the CPU 10a directly goes to S695, in which the CPU 10a temporarily ends the routine.

Figure 9C:
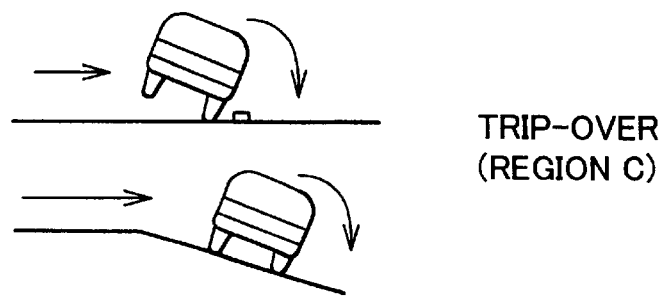
FIG. 9C is a diagram illustrating one state of a trip-over among the rollovers of the vehicle.

Thus, if the actual lateral acceleration GY is relatively great while the actual roll angle RA is relatively small, i.e., if it is determined that the state of the vehicle is in the region C in the mode discrimination map of FIG. 7, there is a high possibility of the vehicle rolling over due to a wheel impinging on a curb or the vehicle rolling over while skidding on dirt or a pavement surface as in FIG. 9C. This fashion of rollover is termed "trip-over." Here, the lateral acceleration GY and the roll rate RR exhibit changes in an earlier period than the roll angle RA according to experiments. Therefore, the lateral acceleration GY and the roll rate RR are adopted as physical quantities for the rollover determination.

Figure 11:
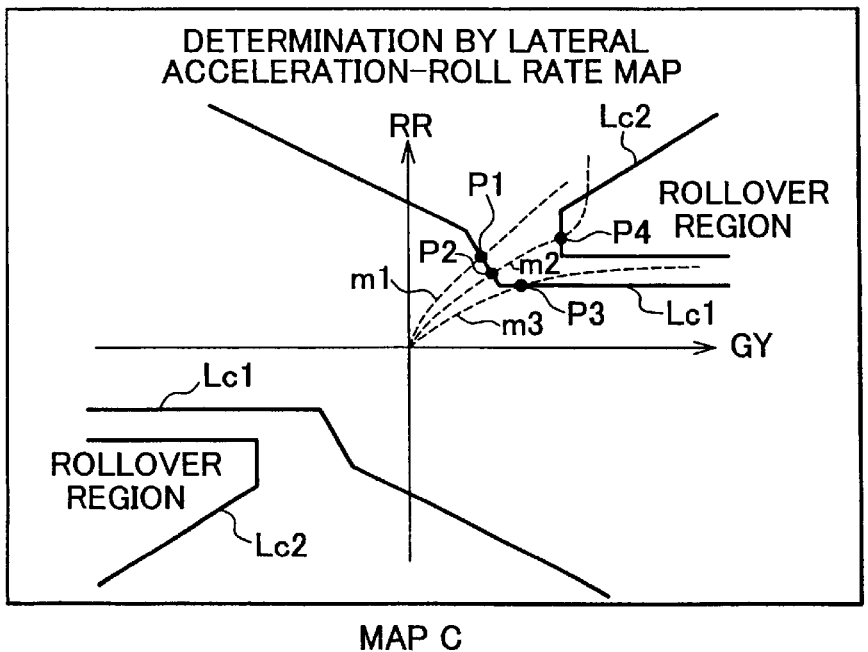
FIG. 11 is another embodiment of a map which is referred to when the CPU determines whether a rollover is about to occur.

FIG. 11 indicates changes in the lateral acceleration GY and the roll rate RR separately for a case where the vehicle rolls over while skidding on dirt or a pavement surface (curve m1), a case where the vehicle rolls over due to a wheel impinging on a curb (curve m2), and a case where the vehicle receives an impact on a side portion of the vehicle (side collision) instead of undergoing a rollover (curve m3). As is apparent from FIG. 11, all the curves extend into the rollover region, crossing the threshold line Lc1 at points P1 to P3, respectively, if the threshold line Lc1 is maintained. Therefore, it may be inaccurately determined that the vehicle will roll over when, in reality, the vehicle undergoes a side collision instead of a rollover.

In the foregoing embodiment, therefore, taking it into consideration that the magnitude of the rate GYA of change in lateral acceleration is considerably greater in the case of a rollover due to impingement of a wheel upon a curb (curve m2), and the case of a sideway impact on the vehicle (curve m3) than in the case where the vehicle rolls over skidding on dirt or a pavement surface (curve m1), the threshold lines are changed to Lc2 if the lateral acceleration change rate GYA is greater than a predetermined value. Therefore, a rollover is determined at a point P4 in the case where the vehicle rolls over due to impingement of a wheel on a curb (curve m2). In contrast, a rollover is not determined in the case where the vehicle collides sideways (curve m3). As a result, the foregoing embodiment is able to distinguish between a rollover caused by impingement of a wheel on a curb and a sideway collision of the vehicle, without causing a delay in determination of a rollover that occurs while the vehicle is skidding on dirt or a pavement surface. Although in the embodiment, the threshold lines Lc1, Lc2 are switched based on the magnitude of the lateral acceleration change rate GYA, the threshold lines Lc1, Lc2 may also be switched based on a peak value of the lateral acceleration in a predetermined period. Specifically, the threshold lines Lc1 are selected if the peak value is less than a predetermined value. The threshold lines Lc2 are selected if the peak value is greater than the predetermined value.

Next, a description of an operation of a rollover determining apparatus for detecting an abnormality in the roll rate sensor 22 will be provided. The CPU 10a executes a program illustrated by the flowchart of FIG. 12 at every elapse of a predetermined time. Therefore, at a predetermined timing, the CPU 10a starts processing at S1200, and proceeds to S1205, in which the CPU 10a reads the lateral acceleration GY and the roll rate RR from the lateral acceleration sensor 21 and the roll rate sensor 22. Subsequently in S1210, the CPU 10a determines whether the absolute value of the lateral acceleration GY is less than a predetermined value εGY. As for the predetermined value εGY, a value that is slightly greater than the possible maximum value of the absolute value of the lateral acceleration GY is selected if the vehicle is running straight.

If the vehicle is not running straight, then the absolute value of the lateral acceleration GY is greater than the predetermined value εGY. Therefore, the CPU 10a makes a negative determination ("NO") in S1210, and proceeds to S1215, in which the CPU 10a sets the value of a counter CGY to "0". Subsequently in S1220, the CPU 10a sets a roll rate accumulated value SRR to "0". Subsequently in S1225, the CPU 10a determines whether the value of the counter CGY is greater than a predetermined set value SETGY that is greater than "1". In this case, the value of the counter CGY is less than the predetermined set value SETGY since the value of the counter CGY has been set to "0" in S1215. Therefore, the CPU 10a makes a negative determination ("NO") in S1225, and proceeds to S1295, in which the CPU 10a temporarily ends the routine. Thus, if the vehicle is not running straight, the value of the counter CGY and the value of the roll rate accumulated value SRR are both set to "0", and the determination regarding abnormality of the roll rate sensor 22 is not executed.

If the state of the vehicle changes into a straight run state, the absolute value of the lateral acceleration GY becomes less that the predetermined value εGY. Therefore, in S1210 subsequent to execution of S1205 at a predetermined timing, the CPU 10a makes an affirmative determination ("YES"). Then, the CPU 10a proceeds to S1230, in which the CPU 10a increases the value of the counter CGY by "1." Subsequently, in S1235, the CPU 10a sets a value obtained by adding the value of the roll rate RR read in S1205 to the present value of the roll rate accumulated value SRR, as a new roll rate accumulated value SRR.

The CPU 10a subsequently proceeds to S1225. Since this stage occurs immediately after the transition from a non-straight run state to the straight run state, the value of the counter CGY is "1," and is therefore less than the predetermined set value SETGY. Therefore, the CPU 10a makes a negative determination ("NO") in S1225, and proceeds to S1295, in which the CPU 10a temporarily ends the routine.

After that, if the straight run state of the vehicle continues, the CPU 10a repeatedly executes the process of S1205, S1210, S1230, S1235, S1225 and S1295. Therefore, the value of the counter CGY gradually increases due to execution of S1230. In this manner, the value of the counter CGY increases in accordance with the continuation time of the straight run state of the vehicle.

Therefore, if the straight run state of the vehicle continues for a predetermined time, the value of the counter CGY becomes greater than the set value SETGY. Therefore, the CPU 10a makes an affirmative determination ("YES") in S1225, and proceeds to S1240, in which the CPU 10a determines an average value RRAVE of roll rate by dividing the roll rate accumulated value SRR by the set value SETGY. Subsequently in S1245, the CPU 10a determines whether the roll rate average value RRAVE is greater than a predetermined abnormality criterion εRR.

If the roll rate average value RRAVE is greater than the abnormality criterion εRR, the CPU 10a makes an affirmative determination ("YES") in S1245. Subsequently in S1250, the CPU 10a sets "1" as the value of a roll rate sensor abnormality flag FDIAGRR for indicating that the roll rate sensor 22 is abnormal. In S1255, the CPU 10a sets the aforementioned sensor failure flag FDIAG to "1." Subsequently in S1295, the CPU 10a temporarily ends the routine.

Conversely, if at the time of determination in S1245, the roll rate average value RRAVE is less than the abnormality criterion $\epsilon$RR, the CPU 10a makes a negative determination ("NO") in S1245, and proceeds to S1260, in which CPU 10a sets the value of the roll rate sensor abnormality flag FDIAGRR to "0." Subsequently in S1265, the CPU 10a sets the value of the sensor failure flag FDIAG to "0." Subsequently in S1295, the CPU 10a temporarily ends the routine.

Thus, if the straight run state of the vehicle continues for at least a predetermined time, i.e., if the state in which the absolute value of the lateral acceleration GY detected by the lateral acceleration sensor 21 is less than the value $\epsilon$GY continues for at least the predetermined time, the rollover determining apparatus determines that the roll rate sensor 22 is abnormal, provided that the average value RRAVE of the roll rates RR detected by the roll rate sensor 22 during the continuation time of the straight run state is greater than the predetermined value $\epsilon$RR. Subsequently to the determination, the CPU 10a sets the value of the sensor failure flag FDIAG to "1."

Next a description of an operation of the rollover determining apparatus for detecting an abnormality in the lateral acceleration sensor 21 will be provided. The CPU 10a executes a program illustrated by the flowchart of FIG. 13 at every elapse of a predetermined time. Therefore, when a predetermined timing is reached, the CPU 10a starts processing in S1300, and proceeds to S1305, in which the CPU 10a reads the lateral acceleration GY and the roll rate RR from the lateral acceleration sensor 21 and the roll rate sensor 22. Subsequently in S1310, the CPU 10a integrates the roll rate RR with respect to time to calculate a roll angle RA. Subsequently in S1315, the CPU 10a determines whether the roll rate RR is less than a predetermined value $\epsilon$RR and the roll angle RA is less than a predetermined value $\epsilon$RA.

If the roll rate RR is greater than the value $\epsilon$RR or that the roll angle RA is greater than the value $\epsilon$RA, then the CPU 10a makes a negative determination ("NO") in S1315, and proceeds to S1320, in which the CPU 10a sets the value of a counter CRR to "0." In S1325, the CPU 10a sets the lateral acceleration accumulated value SGY to "0." Subsequently in S1330, the CPU 10a determines whether the value of the counter CRR is greater than a predetermined set value SETRR that is greater than "1." In this case, the value of the counter CRR is less than the set value SETRR since the value of the counter CRR has been set to "0" in S1320. Therefore, the CPU 10a makes a negative determination ("NO") in S1330, and proceeds to S1395, in which the CPU 10a temporarily ends the routine. Thus, if the roll rate RR is greater than the value $\epsilon$RR or the roll angle RA is greater than the value $\epsilon$RA, the value of the counter CRR and the value of the lateral acceleration accumulated value SGY are both set to "0," and the abnormality determination regarding the lateral acceleration sensor 21 is not executed.

If from this state, the roll rate RR becomes less than the predetermined value $\epsilon$RR and the roll angle RA becomes less than the predetermined value $\epsilon$RA, the CPU 10a executes S1305 and S1310 at predetermined timing. Then, in S1315, the CPU 10a makes an affirmative determination ("YES") followed by S1335, in which the CPU 10a increases the value of the counter CRR by "1." Subsequently in S1340, the CPU 10a sets a value obtained by adding the value of the lateral acceleration GY read in S1305 to the present value of the lateral acceleration accumulated value SGY, as a new lateral acceleration accumulated value SGY.

The CPU 10a subsequently proceeds to S1330. The present stage is immediately after the condition of S1315 has been met and, before that, the value of the counter CRR was "0" due to S1320. Therefore, the value of the counter CRR is presently "1." Hence, the value of the counter CRR is less than the predetermined set value SETRR. Therefore, the CPU 10a makes a negative determination ("NO") in S1330, and proceeds to S1395, in which the CPU 10a temporarily ends the routine.

After that, if this state continues, the CPU 10a repeatedly executes the process of S1305, S1310, S1315, S1335, S1340, S1330 and S1395. Therefore, the value of the counter CRR gradually increases. Hence, at the elapse of a predetermined time, the value of the counter CRR becomes greater than the set value SETRR. Therefore, the CPU 10a makes an affirmative determination ("YES") in S1330, and proceeds to S1345, in which the CPU 10a determines an average value GYAVE of lateral accelerations by dividing the lateral acceleration accumulated value SGY by the set value SETRR. Subsequently in S1350, the CPU 10a determines whether the lateral acceleration average value GYAVE is greater than a predetermined abnormality criterion $\epsilon$GY.

If the lateral acceleration average value GYAVE is greater than the abnormality criterion $\epsilon$GY, the CPU 10a makes an affirmative determination ("YES") in S1350. Subsequently in S1355, the CPU 10a sets "1" as the value of a lateral acceleration sensor abnormality flag FDIAGGY for indicating that the lateral acceleration sensor 21 is abnormal. In S1360, the CPU 10a sets the sensor failure flag FDIAG to "1." Subsequently in S1395, the CPU 10a temporarily ends the routine.

Conversely, if at the time of determination in S1350, the lateral acceleration average value GYAVE is less than the abnormality criterion $\epsilon$GY, the CPU 10a makes a negative determination ("NO") in S1350, and proceeds to S1365, in which CPU 10a sets the value of the lateral acceleration sensor abnormality flag FDIAGGY to "0." Subsequently, in S1370, the CPU 10a sets the value of the sensor failure flag FDIAG to "0." Subsequently in S1395, the CPU 10a temporarily ends the routine.

Thus, if a state in which the roll rate RR is less than the predetermined value $\epsilon$RR and the roll angle RA is less than the predetermined value $\epsilon$RA continues for at least a predetermined period of time, the CPU 10a determines that the lateral acceleration sensor 21 is abnormal, provided that the average value GYAVE of the lateral accelerations GY detected by the lateral acceleration sensor 21 during the period of time is greater than the predetermined value $\epsilon$GY. Subsequently to the determination, the CPU 10a sets the value of the sensor failure flag FDIAG to "1."

Figure 14:
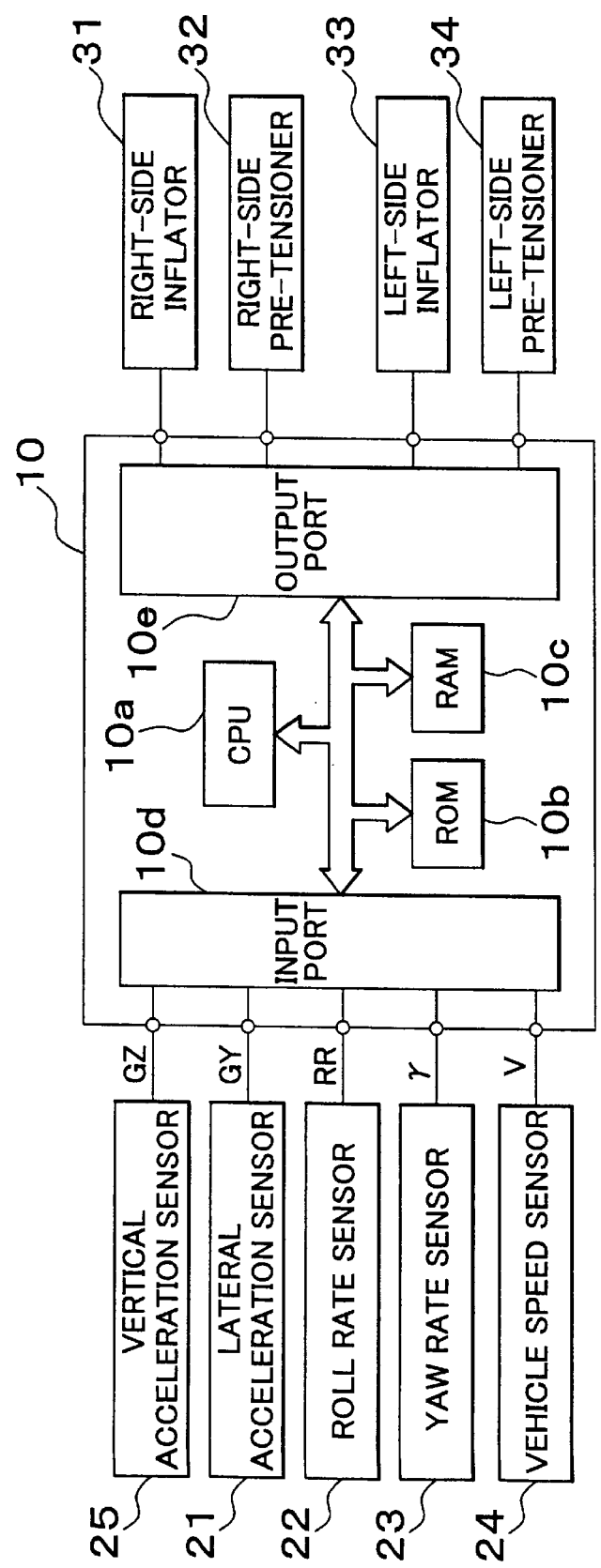
FIG. 14 is a schematic block diagram of a rollover determining apparatus in accordance with a second embodiment of the invention.
Figure 15:
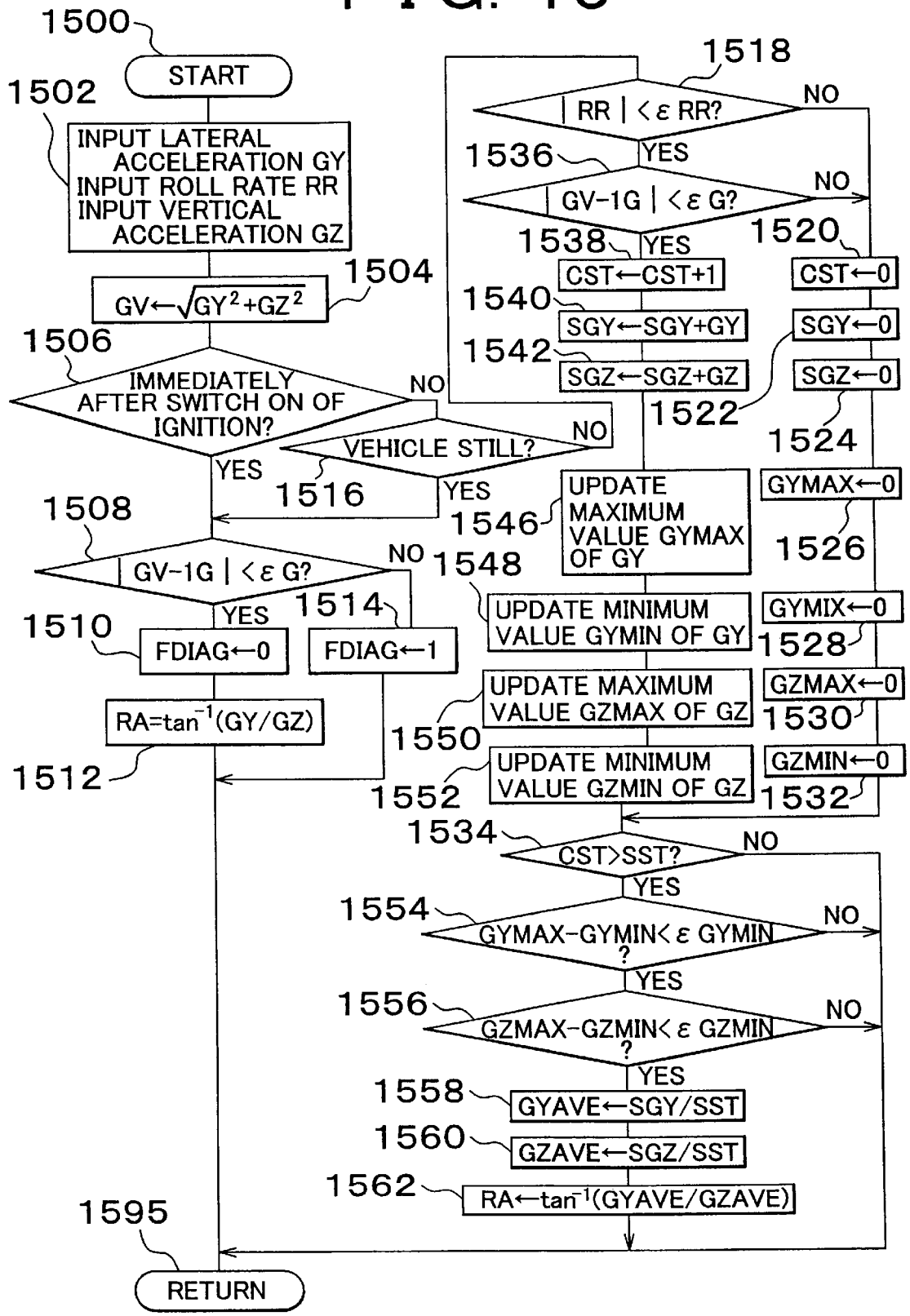
FIG. 15 is a flowchart illustrating one embodiment of a program executed by the CPU shown in FIG. 14.

A second embodiment of the rollover determining apparatus will be described below. The second embodiment is different from the rollover determining apparatus of the first embodiment in that the second embodiment is provided with a vertical acceleration sensor 25 for detecting the acceleration GZ of the vehicle in the up-down directions as shown in FIG. 14. The second embodiment also differs from the first embodiment in that the CPU 10a executes a program illustrated by the flowchart of FIG. 15 at every elapse of a predetermined time, besides the programs illustrated in FIGS. 6, 12 and 13.

First, features of the second embodiment will be described in comparison with the first embodiment. In the first embodiment, the roll angle RA at the time of a start of the vehicle is set as "0," and after that, the roll angle RA is determined by integrating the roll rate RR detected by the roll rate sensor 22. However, if the vehicle is started in a state where the vehicle is parked on an inclined surface, the initial value of the roll angle RA is actually not "0" in some cases. Therefore, the roll angle RA is not accurate in some cases in the first embodiment. Therefore, in the second embodiment, an initial value of the roll angle is determined through the use of the detected vertical acceleration GZ and the lateral acceleration GY, thereby improving the precision in estimating the roll angle RA. Hereinafter, an operation of the second embodiment will be described with reference to FIG. 15.

A description will now be provided where the ignition switch (not shown) of the vehicle is switched from an off-state to an on-state. At a predetermined timing, the CPU 10a starts processing the program illustrated in FIG. 15, at S1500. Subsequently in S1502, the CPU 10a reads the lateral acceleration GY, the roll rate RR, and the vertical acceleration GZ from the lateral acceleration sensor 21, the roll rate sensor 22, and the vertical acceleration sensor 25, respectively. Subsequently in S1504, the CPU 10a determines the magnitude GV of a resultant acceleration (vector) of the lateral acceleration GY and the vertical acceleration GZ.

Subsequently in S1506, the CPU 10a determines whether the ignition switch (not shown) of the vehicle has just been changed from the off-state to the on-state. In this case, the ignition switch of the vehicle has just been changed from the off-state to the on-state, so that the CPU 10a makes an affirmative determination ("YES") in S1506, and proceeds to S1508. In S1508, the CPU 10a determines whether the absolute value of a difference between the magnitude GV of the resultant acceleration determined in S1508 and 1 G (G being the gravitational acceleration) is less than a predetermined value εG.

During this stage, the vehicle is considered to be in a still state since the ignition switch has just been changed from the off-state to the on-state. Therefore, if the lateral acceleration sensor 21 and the vertical acceleration sensor 25 are normal, the magnitude GV of the resultant acceleration is about 1 G. Thus, the absolute value of the difference between the magnitude GV of the resultant acceleration and 1 G is less than the predetermined value εG. Therefore, the CPU 10a makes an affirmative determination ("YES") in S1508, and proceeds to S1510. In S1510, the CPU 10a sets the value of the sensor failure flag FDIAG to "0." Subsequently in S1512, the roll angle RA is determined in accordance with Equation 3.

$$RA=\tan^{-1}(GY/GZ) \qquad \text{Equation 3}$$

Figure 6:
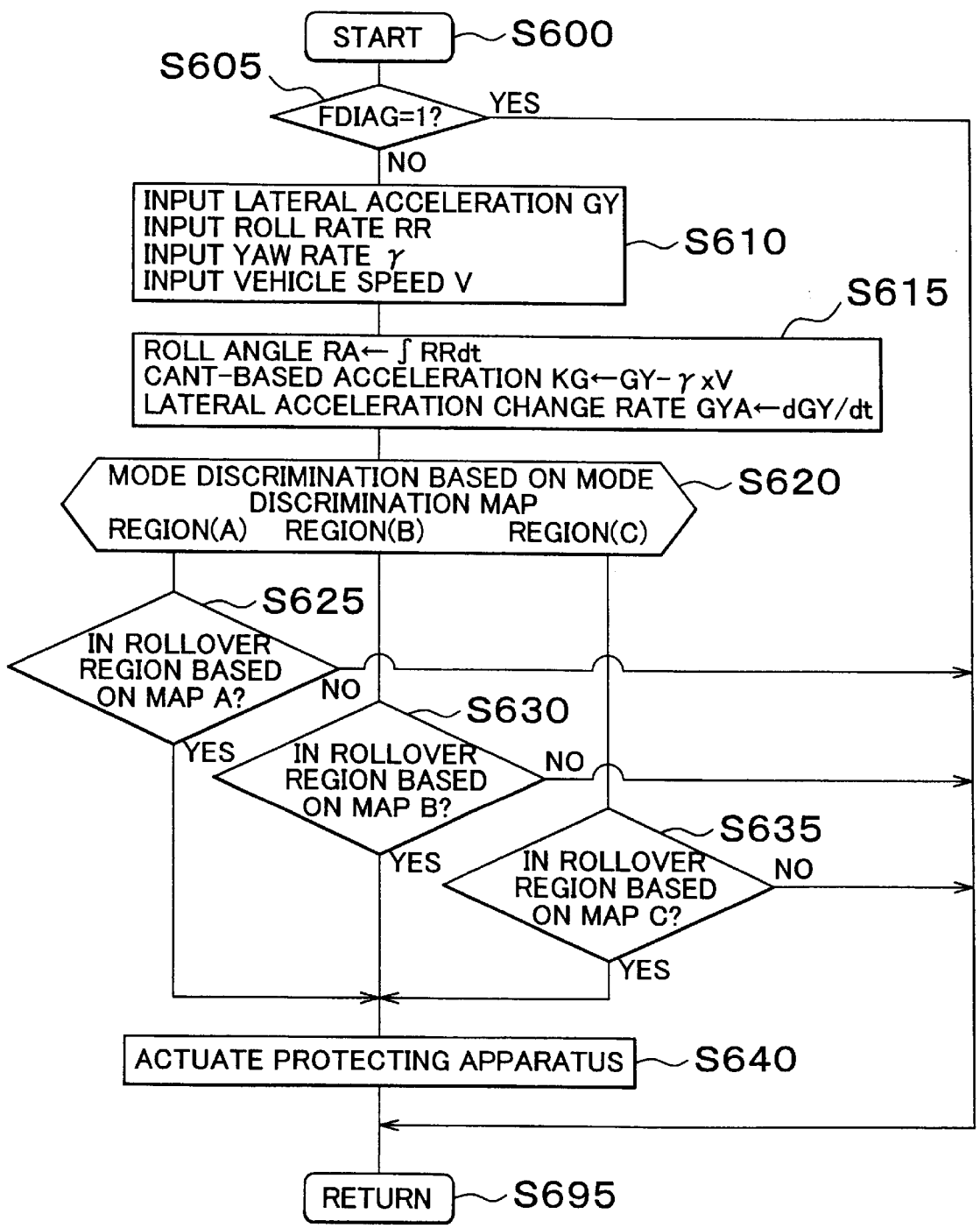
FIG. 6 is a flowchart illustrating a program executed by one embodiment of a CPU to determine whether a rollover is about to occur.

The roll angle RA is used as an initial value for the integration of the roll rate RR in S615 in FIG. 6. After that, the CPU 10a proceeds to S1595, in which the CPU 10a temporarily ends the routine.

Conversely, if the absolute value of the difference between the magnitude GV of the resultant acceleration and 1 G is greater than or equal to the predetermined value εG, it is considered that either the lateral acceleration sensor 21 or the vertical acceleration sensor 25 has an abnormality. In this case, the CPU 10a makes a negative determination ("NO") in S1508, and proceeds to S1514, in which the CPU 10a sets the value of the sensor failure flag FDIAG to "1." As a result, the CPU 10a makes an affirmative determination ("YES") in S605 in FIG. 6, and does not execute the rollover determination.

A description will now be provided where the vehicle is in a still state which is not immediately subsequent to the changing of the ignition switch from the off-state to the on-state. In this case, the CPU 10a makes a negative determination ("NO") in S1506, and proceeds to S1516, in which the CPU 10a determines whether the vehicle is in the still state. This determination regarding the still state is made by, for example, determining whether the vehicle speed V is "0." Since the vehicle is in the still state in this case, the CPU 10a makes an affirmative determination ("YES") in S1516, and proceeds to S1508. Thus, similarly to the case where the ignition switch has just been changed from the off-state to the on-state, the initial value of the roll angle RA is determined, and the value of the sensor failure flag FDIAG is changed.

A description will now be provided where the vehicle is not in a still state immediately following the changing of the ignition switch from the off-state to the on-state and where the absolute value of the roll rate RR is relatively great.

In this case, the CPU 10a makes a negative determination ("NO") in S1506 and also in S1516, and then proceeds to S1518. In S1518, the CPU 10a determines whether the absolute value of the roll rate RR is less than a predetermined value εRR. Here, the absolute value of the roll rate RR is greater than the predetermined value εRR. Therefore, the CPU 10a makes a negative determination ("NO") in S1518, and proceeds to S1520, in which the CPU 10a sets the value of a counter CST "0." Subsequently, the CPU 10a executes S1522 to S1532, thereby setting the lateral acceleration accumulated value SGY, a vertical acceleration accumulated value SGZ, a maximum value GYMAX of the lateral acceleration GY, a minimum value GYMIN of the lateral acceleration GY, a maximum value GZMAX of the vertical acceleration GZ, and a minimum value GZMIN of the vertical acceleration GZ to "0."

Subsequently in S1534, the CPU 10a determines whether the value of the counter CST is greater than a predetermined set value SST that is greater than "1." Since the value of the counter CST has been set to "0" in S1520, the CPU 10a makes a negative determination ("NO") in S1534, and proceeds to S1595, in which the CPU 10a temporarily ends the routine. Therefore, in this case, the initial value of the roll angle RA is not updated, and the value of the sensor failure flag FDIAG is not changed either.

This operation is also performed when the vehicle is not in a still state that immediately follows the changing of the ignition switch from the off-state to the on-state, and when the absolute value of the roll rate RR is less than the predetermined value εRR but the absolute value of the difference between the magnitude GV of the resultant acceleration and 1 G is greater than the predetermined value εG. In this case, the CPU 10a makes an affirmative determination ("YES") in S1518. Subsequently in S1536, the CPU 10a determines whether the absolute value of the difference between the magnitude GV of the resultant acceleration and 1 G is less than the predetermined value εG. In this case, the determination is negative ("NO"). Subsequently, the CPU 10a executes S1520 to S1534, and then executes S1595.

If from this state, the absolute value of the roll rate becomes less than the predetermined value εRR and the absolute value of the difference between the magnitude GV of the resultant acceleration and 1 G becomes less than the predetermined value εG, the CPU 10a makes an affirmative determination ("YES") in S1518 and also in S1536, and proceeds to S1538. In S1538, the CPU 10a increases the value of the counter CST by "1." Subsequently in S1540, the CPU 10a sets the value obtained by adding the lateral acceleration GY to the present lateral acceleration accumulated value SGY as a new lateral acceleration accumulated value SGY. Subsequently in S1542, the CPU 10a sets the value obtained by adding the vertical acceleration GZ to the present vertical acceleration accumulated value SGZ as a new vertical acceleration accumulated value SGZ.

Subsequently in S1546, the CPU 10a sets the present lateral acceleration GY as a new maximum lateral acceleration GYMAX if the present lateral acceleration GY read in S1502 is greater than the present maximum lateral acceleration GYMAX. After that, in S1548, the CPU 10a sets the present lateral acceleration GY as a new minimum lateral acceleration GYMIN if the present lateral acceleration GY read in S1502 is less than the present minimum lateral acceleration GYMIN.

Subsequently in S1550, the CPU 10a sets the present vertical acceleration GZ as a new maximum vertical acceleration GZMAX if the present vertical acceleration GZ read in S1502 is greater than the present maximum vertical acceleration GZMAX. After that, in S1552, the CPU 10a sets the present vertical acceleration GZ as a new minimum vertical acceleration GZMIN if the present vertical acceleration GZ read in S1502 is less than the present minimum vertical acceleration GZMIN.

Subsequently in S1534, the CPU 10a determines whether the value of the counter CST is greater than the predetermined set value SST. At this stage, the value of the counter CST is "1." Therefore, the CPU 10a makes a negative determination ("NO") in S1534, and proceeds to S1595, in which the CPU 10a temporarily ends the routine.

If this state continues, the value of the counter CST gradually increases due to execution of S1538. Therefore, if the state continues for a predetermined time, the value of the counter CST becomes greater than the predetermined set value SST. As a result, the CPU 10a makes an affirmative determination ("YES") in S1534, and proceeds to S1554. In S1554, the CPU 10a determines whether the value obtained by subtracting the minimum lateral acceleration GYMIN from the maximum lateral acceleration GYMAX is less than a predetermined value $\epsilon$GYMIN. If the determination in S1554 is negative ("NO"), the CPU 10a proceeds to S1595, in which the CPU 10a temporarily ends the routine.

Conversely, if the determination in S1554 is affirmative ("YES"), the CPU 10a proceeds to S1556, in which the CPU 10a determines whether the value obtained by subtracting the minimum vertical acceleration GZMIN from the maximum vertical acceleration GZMAX is less than a predetermined value $\epsilon$GZMIN. If the determination in S1556 is negative ("NO"), the CPU 10a proceeds to S1595, in which the CPU 10a temporarily ends the routine. Conversely, if the determination in S1556 is affirmative ("YES"), the CPU 10a determines that the vehicle is in a steady run state, and proceeds to S1558.

In S1558, the CPU 10a determines a lateral acceleration average value GYAVE by dividing the lateral acceleration accumulated value SGY by the set value SST. Subsequently in S1560, the CPU 10a determines a vertical acceleration average value GZAVE by dividing the vertical acceleration accumulated value SGZ by the set value SST. Subsequently in S1562, the CPU 10a determines a roll angle RA as in Equation 4.

$$RA = \tan^{-1}(GYAVE/GZAVE) \quad \text{Equation 4}$$

The roll angle RA is used as an initial value in the integration of the roll rate RR in S615 in FIG. 6. Subsequently in S1595, the CPU 10a temporarily ends the routine.

According to the second embodiment, if the ignition switch of the vehicle has just been changed from the off-state to the on-state, or if the vehicle is in the still state, an initial value of the roll angle RA is determined by equation 3. If the vehicle is in a steady run state where the absolute value of the roll rate RR is small and where the resultant acceleration approximately equals 1 G, an initial value of the roll angle RA is determined by equation 4. Therefore, the roll angle RA can be estimated with good precision even in a case where the vehicle is started in a state where the vehicle is stopped on an inclined surface.

Figure 16:
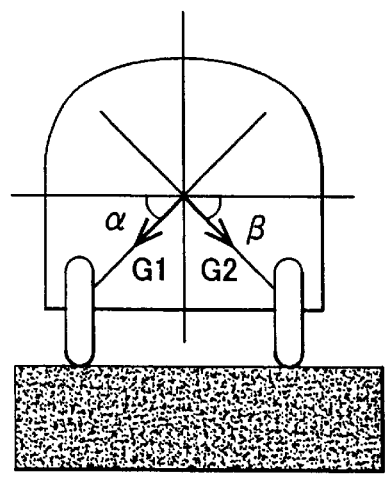
FIG. 16 is a back elevation of a vehicle for illustrating the direction of detection of an acceleration sensor in accordance with the second embodiment of this invention.

The second embodiment may be modified as follows. That is, the lateral acceleration sensor 21 and the vertical acceleration sensor 25 are replaced by two acceleration sensors that are disposed in such an X-arrangement as indicated in FIG. 16 as to detect an acceleration G1 in a diagonally left-downward direction and an acceleration G2 in a diagonally right-downward direction. A lateral acceleration GY and a vertical acceleration GZ are determined from the accelerations G1, G2 as in Equations 5 and 6.

$$GY = G2 \times \cos\beta - G1 \times \cos\alpha \quad \text{Equation 5}$$

$$GZ = G1 \times \sin\alpha + G2 \times \sin\beta \quad \text{Equation 6}$$

Figure 13:
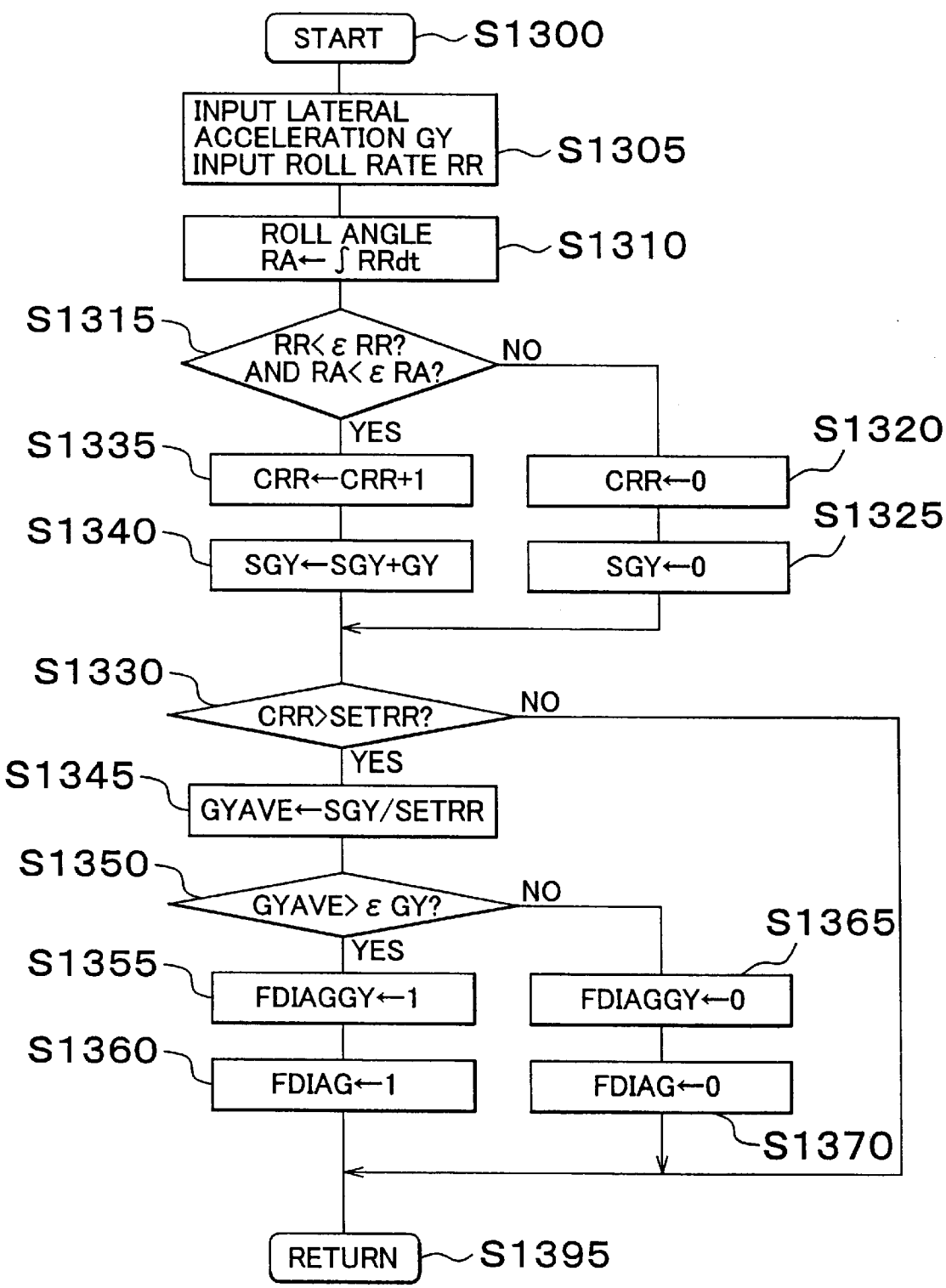
FIG. 13 is a flowchart illustrating one embodiment of a program executed by the CPU to determine whether the lateral acceleration sensor has an abnormality.

In this case, by applying a program similar to that illustrated in FIG. 13 to the acceleration sensors, that is, by determining an average value of the output of each acceleration sensor by the processes of S1335, S1340, S1345, etc., it becomes possible to specify which one of the acceleration sensors has an abnormality.

Figure 17:
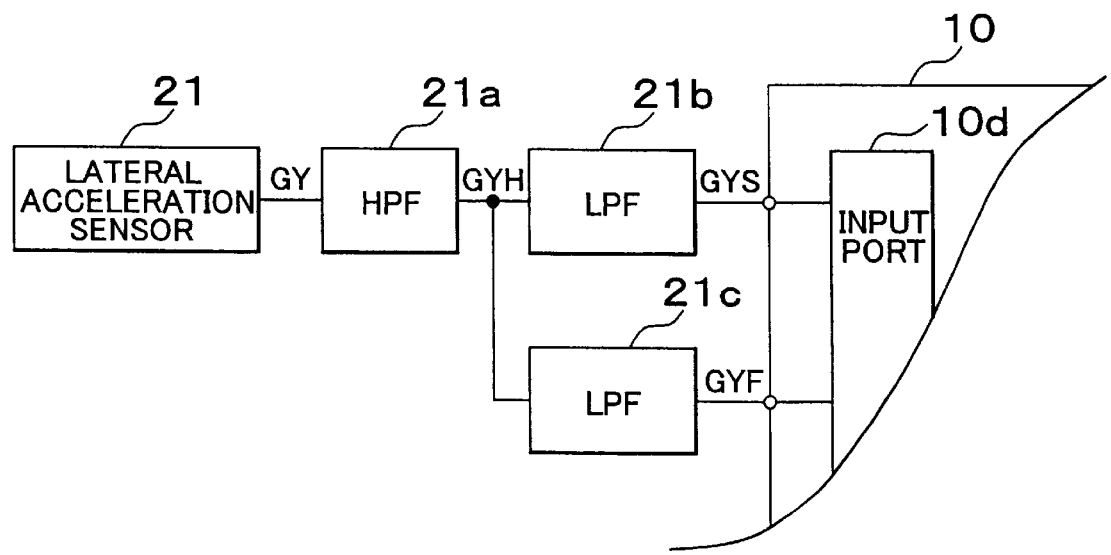
FIG. 17 is a block diagram illustrating a connecting relationship between an electric control unit and a lateral acceleration sensor in accordance with a third embodiment of this invention.

A third embodiment will next be described with reference to FIGS. 17 and 18. Although in the first embodiment, the threshold line in the map C in FIG. 11 is switched between the threshold lines Lc1 and Lc2 in accordance with the lateral acceleration change rate GYA in the determination regarding a trip-over in S635 in FIG. 6, the third embodiment accomplishes the switching between the threshold lines Lc1, Lc2 by a different method.

Points that distinguish the third embodiment from the foregoing embodiments will be described. In the third embodiment, the output GY of the lateral acceleration sensor 21 is inputted to a high-pass filter 21a as indicated in FIG. 17. The output GYH of the high-pass filter 21a is inputted to a low-pass filter 21b and a low-pass filter 21c. The outputs GYS, GYF of the low-pass filters 21b, 21c are independently inputted to an input port 10d of an electric control unit 10.

The high-pass filter 21a is a filter for removing a drift of the lateral acceleration sensor 21. The cutoff frequency of the high-pass filter 21a is, for example, about 0.02 Hz. The cutoff frequency of the low-pass filter 21b (first cutoff frequency) is, for example, 5 Hz, The cutoff frequency of the low-pass filter 21c (second cutoff frequency) is higher than the first cutoff frequency, and is, for example, 20 Hz.

A CPU 10a in accordance with the third embodiment reads the lateral acceleration GYS and the lateral acceleration GYF instead of the lateral acceleration GY in S610 in FIG. 6. Furthermore, the calculation of the lateral acceleration change rate GYA in S615 is omitted. Moreover, in S620, the CPU 10a determines which one of the regions in the mode discrimination map in FIG. 7 contains the state of the vehicle (the point determined by the lateral acceleration GYF and the roll angle RA) based on the lateral acceleration GYF and the roll angle RA, which are physical quantities that indicate the present state of the vehicle.

If the lateral acceleration GYF and the actual roll angle RA are substantially proportional to each other, the CPU 10a determines that the state of the vehicle is in the region B in FIG. 7, and therefore proceeds from S620 to S630. In S630, the CPU 10a determines whether the vehicle is about to roll over based on the actual lateral acceleration GYF and the actual roll rate RR, and the map G indicated in FIG. 10.

If the lateral acceleration GYF (magnitude thereof) is relatively great whereas the actual roll angle RA (magnitude thereof) is relatively small, the CPU 10a determines that the state of the vehicle is in the region C in FIG. 7, and proceeds from S620 to S635. In S635, the CPU 10a executes a trip-over determining sub-routine illustrated by the flowchart of FIG. 18.

Figure 18:
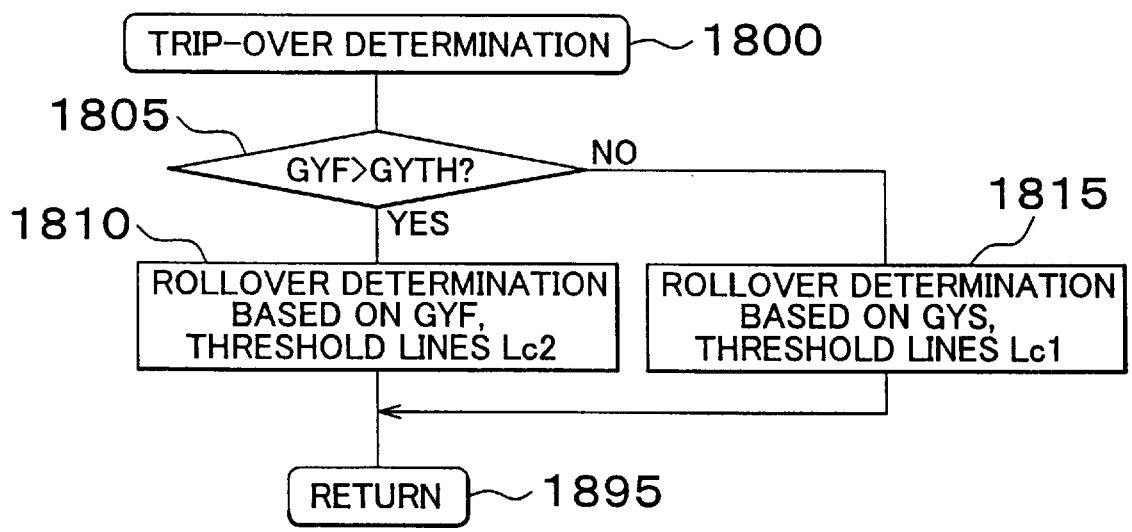
FIG. 18 is a flowchart illustrating one embodiment of a program executed by a CPU in accordance with the third embodiment of this invention.

Upon proceeding to S635, the CPU 10a starts processing in S1800 in FIG. 18. Subsequently in S1805, the CPU 10a determines whether the actual lateral acceleration GYF is greater than a predetermined threshold GYTH (e.g., 30 m/s$^2$). The threshold GYTH is selected as a value for distinguishing between the case where a wheel of the vehicle impinges on a curb or the like and the case where the vehicle rolls over skidding on dirt or a pavement surface. The threshold GYTH is set at a value which is below an ordinary range of variation where most lateral accelerations GYF caused by an impact of a wheel on a curb or the like are distributed, and which is above an ordinary range of variation where most lateral accelerations GYF caused when the vehicle rolls over skidding on dirt or a pavement surface are distributed.

If the actual lateral acceleration GYF is greater than the predetermined threshold GYTH, the CPU 10a makes an affirmative determination ("YES") in S1805, and proceeds to S1810. In S1810, the CPU 10a determines whether the vehicle is about to roll over based on the threshold lines Lc2 in the map C indicated in FIG. 11 and the state of the vehicle indicated by the lateral acceleration GYF and the roll rate RR. Conversely, if the actual lateral acceleration GYF is less than or equal to the threshold GYTH, the CPU 10a makes a negative determination ("NO") in S1805, and proceeds to S1815. In S1815, the CPU 10a determines whether the vehicle is about to roll over based on the threshold lines Lc1 in the map C indicated in FIG. 11 and the state of the vehicle indicated by the lateral acceleration GYS and the roll rate RR.

As a result, if it is determined in S1810 or S1815 that the vehicle is about to roll over (if it is determined that the state of the vehicle is in the rollover region), the CPU 10a proceeds to S640 in FIG. 6. In S640, the CPU 10a actuates the occupant protecting apparatus on the rollover side. Subsequently in S695, the CPU 10a temporarily ends the routine illustrated in FIG. 6. Conversely, if it is determined in S1810 or S1815 that the vehicle is not about to roll over (if it is determined that the state of the vehicle is not in the rollover region), the CPU 10a immediately proceeds to S695 in FIG. 6, in which the CPU 10a temporarily ends the routine illustrated in FIG. 6.

As described above, according to the third embodiment, if the magnitude of the lateral acceleration GYF filtered by the low-pass filter 21c that passes a relatively high-frequency component (a signal having a frequency up to the second cutoff frequency) of the output of the lateral acceleration sensor 21 is less than or equal to the predetermined threshold GYTH, it is determined whether the vehicle is about to roll over by using the threshold lines Lc1 for determining whether the vehicle is about to roll over skidding on dirt or a pavement surface. Conversely, if the magnitude of the lateral acceleration GYF is greater than the predetermined threshold GYTH, it is determined whether the vehicle is about to roll over by using the threshold lines Lc2 for discriminating between a side collision and a trip-over caused by an impact of a wheel upon a curb or the like. Therefore, as in the first embodiment in which the threshold lines are switched between Lc1 and Lc2 based on the lateral acceleration change rate GYA, it is possible to distinguish between a sideway collision of the vehicle and a rollover caused by an impact of a wheel on a curb without causing a delay in the rollover determination as to whether the vehicle is about to roll over skidding on a road surface. When off-road running of the vehicle occurs, the lateral acceleration GYF may cross the threshold lines Lc1 even when a rollover is not likely. However, the possibility of the lateral acceleration GYS crossing the threshold lines Lc1 is very low. In this respect, too, the rollover determination precision can be improved.

Although in the third embodiment, the high-pass filter 21a and the low-pass filters 21b, 21c are formed by a hardware circuit arrangement, the functions of these filters may be realized by filter processing executed by the CPU 10a (software).

According to the embodiments of the invention as described above, the types, i.e., fashions, modes, of rollovers that can occur on a vehicle are distinguished based on physical quantities (lateral acceleration GY, roll angle RA) that indicate the state of the vehicle. Using a determination condition (discrimination condition) in accordance with the discriminated type of rollover, it is determined whether the vehicle is about to roll over. Therefore, it becomes possible to precisely determine whether a rollover is about to occur.

The invention is not limited to the foregoing embodiments, but may be modified in various manners within the scope of the invention. For example, in the foregoing embodiments, the inflator and the pre-tensioner on the rollover side of the vehicle are actuated if it is determined that the vehicle is about to roll over. The inflator and the pre-tensioner on the non-rollover side may also be actuated.

Although in the maps A to C, two threshold lines are provided, it is also possible to provide three or more threshold lines selectable in accordance with the magnitudes of the cant-based acceleration KG, the yaw rate y, and the lateral acceleration change rate. Furthermore, in the first to third embodiments, the threshold lines for the rollover determination are changed. This is a concept that includes an arrangement in which maps are prepared separately for various threshold lines and the maps are selectively used (that is equivalent to the switching of maps).

Still further, although in the foregoing embodiments, the rate of change in the lateral acceleration is calculated through time differentiation of the lateral acceleration GY in S615 in FIG. 6, it is also possible to filter the lateral acceleration GY through two low-pass filters having different cutoff frequencies and use a difference between the signals outputted from the two low-pass filters as a substitute for the rate of change in the lateral acceleration.

Furthermore, the vehicle speed may be used as a physical quantity for use for determining whether the vehicle is about to roll over. More specifically, if the vehicle speed is low, the yaw rate γ is likely to become great but the possibility of rollover is low. Therefore, the threshold lines Lb in the map B (related to the turn-over) are changed so as to become remoter from the point of origin as the vehicle speed becomes lower.

As a physical quantity for use for determining whether the vehicle is about to roll over, the shift range may also be used. Specifically, when a shift range for an off-road run L4, i.e., an extra-low gear speed in the four-wheel drive state is selected, the sensors, such as the lateral acceleration sensor 21, the roll rate sensor 22, etc., are likely to have noises, in comparison with a case where a normal run-purposed shift range (H4) is selected. Furthermore, when the off-road run-purposed shift range is selected, occupants are less likely to be injured if a rollover should occurs. Therefore, in that case, the threshold lines La in the map A, as for example, are changed so as to be remoter from the point of origin.

Furthermore, if it is determined that there is a possibility of the vehicle having a trip-over in the foregoing embodiments, the map C is adopted (i.e., the lateral acceleration GY and the roll rate RR are adopted as physical quantities for determination), and the threshold lines Lc1 prescribing the relationship between the lateral acceleration GY and the roll rate RR are changed in accordance with the lateral acceleration change rate GYA. Instead of this measurement, or in addition to this measurement, it is possible to adopt the roll angle RA and the roll rate RR as physical quantities for determination, and use a map arranged so that threshold lines prescribing a relationship between the roll angle RA and the roll rate RR and there determining rollover regions are shifted farther apart from the point of origin as the absolute value of the lateral speed VY becomes smaller, in order to determine whether a rollover is about to occur. The lateral speed VY can be determined as in Equation 7 where G is the gravitational acceleration.

$$VY = \int (KG - G \times \sin(RA)) \qquad \text{Equation 7}$$

In the illustrated embodiments, the controller is implemented with a general purpose processor. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller can be a plurality of separate dedicated or programmable integrated or other electronic circuits or devices (e.g., hardwired electronic or logic circuits such as discrete element circuits, or programmable logic devices such as PLDs, PLAs, PALs or the like). The controller can be suitably programmed for use with a general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed.

While the invention has been described with reference to what are preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. A rollover determining apparatus for determining whether a vehicle is about to roll over, comprising:
   a memory that stores a predetermined condition that corresponds to a type of rollover; and
   a controller that distinguishes the type of rollover that is likely to occur to the vehicle based on a first quantity that indicates a state of the vehicle, and that determines that the vehicle is about to rollover if on a rollover determination map that is provided for each type of rollover the first quantity meets the stored predetermined condition that corresponds to the type of rollover distinguished.

2. The rollover determining apparatus according to claim 1, wherein the first quantity includes a lateral acceleration value of the vehicle and a roll angle of the vehicle.

3. The rollover determining apparatus according to claim 2, wherein the controller determines that at least one of a flip-over, turn-over and trip-over is the type of rollover that is likely to occur to the vehicle.

4. The rollover determining apparatus according to claim 3, wherein the controller determines whether the state of the vehicle indicated by the first quantity is in a rollover region determined by a predetermined threshold line, and changes the threshold line in accordance with a magnitude of a second quantity that is different from the first quantity and that corresponds to the type of rollover distinguished.

5. The rollover determining apparatus according to claim 4, wherein if the rollover that is likely to occur to the vehicle is determined to be the flip-over, the controller adopts a roll angle of the vehicle and a roll rate of the vehicle as the first quantity, and adopts a cant-based acceleration as the second quantity.

6. The rollover determining apparatus according to claim 4, wherein if the rollover that is likely to occur to the vehicle is determined to be the turn-over, the controller adopts a roll angle of the vehicle and a roll rate of the vehicle as the first quantity, and adopts a cant-based acceleration as the second quantity.

7. The rollover determining apparatus according to claim 4, wherein if the rollover that is likely to occur to the vehicle is determined to be the trip-over, the controller adopts a lateral acceleration of the vehicle and a roll rate of the vehicle as the first quantity, and adopts a rate of change in the lateral acceleration of the vehicle as the second quantity.

8. The rollover determining apparatus according to claim 1, wherein the controller determines that at least one of a flip-over, a turn-over and a trip-over is the type of rollover that is likely to occur to the vehicle.

9. The rollover determining apparatus according to claim 8, wherein the controller determines whether the state of the vehicle indicated by the first quantity is in a rollover region determined by a predetermined threshold line, and changes the threshold line in accordance with a magnitude of a second quantity that is different from the first quantity and that corresponds to the type of rollover distinguished.

10. The rollover determining apparatus according to claim 9, wherein if the rollover that is likely to occur to the vehicle is determined to be the flip-over, the controller adopts a roll angle of the vehicle and a roll rate of the vehicle as the first quantity, and adopts a cant-based acceleration as the second quantity.

11. The rollover determining apparatus according to claim 9, wherein if the rollover that is likely to occur to the vehicle is determined as the turn-over, the controller adopts a lateral acceleration of the vehicle and a roll rate of the vehicle as the first quantity, and adopts a yaw rate of the vehicle as the second quantity.

12. The rollover determining apparatus according to claim 9, wherein if the rollover that is likely to occur to the vehicle is determined to be the trip-over, the controller adopts a lateral acceleration of the vehicle and a roll rate of the vehicle as the first quantity, and adopts a rate of change in the lateral acceleration of the vehicle as the second quantity.

13. The rollover determining apparatus according to claim 1, wherein the controller determines whether the state of the vehicle indicated by the first quantity is in a rollover region determined by a predetermined threshold line, and changes the threshold line in accordance with a magnitude of a second quantity that is different from the first quantity and that corresponds to the type of rollover distinguished.

14. The rollover determining apparatus according to claim 1, wherein if the state of the vehicle indicated by a roll angle of the vehicle and a roll rate of the vehicle enters a rollover region determined by a threshold line prescribing a relationship between the roll angle and the roll rate, the controller determines that the vehicle is about to roll over, and changes the threshold line in accordance with a cant-based acceleration.

15. The rollover determining apparatus according to claim 1, wherein if the state of the vehicle indicated by a lateral acceleration of the vehicle and a roll rate of the vehicle enters a rollover region determined by a threshold line prescribing a relationship between the lateral acceleration and the roll rate, the controller determines that the vehicle is about to roll over, and changes the threshold line in accordance with a yaw rate of the vehicle.

16. The rollover determining apparatus according to claim 1, wherein if the state of the vehicle indicated by a lateral acceleration of the vehicle and a roll rate of the vehicle enters a rollover region determined by a threshold line prescribing a relationship between the lateral acceleration and the roll rate, the controller determines that the vehicle is about to roll over, and changes the threshold line in accordance with a rate of change in the lateral acceleration of the vehicle.

17. A rollover determining apparatus for determining whether the vehicle is about to roll over, comprising:
   a first detector that detects and outputs a lateral acceleration of the vehicle;
   a second detector that detects a roll rate of the vehicle;
   a first filter that is connected to the first detector and that passes a frequency that is at most a first cutoff frequency;
   a second filter that is connected to the first detector and that passes a frequency that is at most a second cutoff frequency that is higher than the first cutoff frequency; and
   a controller that determines that the vehicle is about to roll over if a state of the vehicle indicated by the lateral acceleration filtered by the first filter and a roll rate of the vehicle detected by the second detector enters a rollover region determined by a first threshold line prescribing a relationship between the lateral acceleration and the roll rate where the lateral acceleration filtered by the second filter meets a predetermined threshold, and that determines that the vehicle is about to roll over if on a rollover determination map that is provided for each type of rollover the state of the vehicle indicated by the lateral acceleration filtered by the second filter and the roll rate of the vehicle detected by the second detector enters a rollover region determined by a second threshold line prescribing a relationship between the lateral acceleration and the roll rate where the lateral acceleration filtered by the second filter is greater than the predetermined threshold.

18. The rollover determining apparatus according to claim 17, wherein the controller distinguishes a type of rollover that is likely to occur to the vehicle based on the detected lateral acceleration and a detected roll angle of the vehicle, and performs a rollover determination based on the type of rollover distinguished.

19. The rollover determining apparatus according to claim 18, wherein the controller determines that at least one of a flip-over, turn-over and trip-over is the type of rollover that is likely to occur to the vehicle.

20. The rollover determining apparatus according to claim 19, wherein the controller performs the rollover determination if the controller distinguishes the type of rollover of the vehicle to be the trip-over.

21. A rollover determining method for determining whether a vehicle is about to roll over, comprising:
   distinguishing a type of rollover that is likely to occur to the vehicle based on a lateral acceleration of the vehicle and a roll angle of the vehicle;
   determining whether the state of the vehicle indicated by a first quantity corresponding to the type of rollover distinguished is in a rollover region on a rollover determination map that is provided for each type of rollover determined by a predetermined threshold line; and
   changing the threshold line in accordance with a magnitude of a second quantity that is different from the first quantity and that corresponds to the type of rollover distinguished.

22. The rollover determining method according to claim 21,
   wherein the type of rollover includes at least one of a flip-over, turn-over and trip-over, and
   the roll angle of the vehicle and a roll rate of the vehicle are adopted as the first quantity, and a cant-based acceleration is adopted as the second quantity, if the type of rollover is distinguished to be the flip-over, and
   the lateral acceleration of the vehicle and the roll rate of the vehicle are adopted as the first quantity, and a yaw rate of the vehicle is adopted as the second quantity, if the type of rollover is distinguished to be the turn-over, and
   the lateral acceleration of the vehicle and the roll rate of the vehicle are adopted as the first quantity, and a rate of change in the lateral acceleration of the vehicle is adopted as the second quantity, if the type of rollover is distinguished to be the trip-over.

23. A rollover determining method for determining whether the vehicle is about to roll over, comprising:
   detecting a lateral acceleration of the vehicle;
   detecting a roll rate of the vehicle;
   acquiring a waveform of a first lateral acceleration formed by a frequency that is at most a first predetermined frequency, from a waveform of the detected lateral acceleration of the vehicle;
   acquiring a waveform of a second lateral acceleration formed by a frequency that is at most a second predetermined frequency and that is higher than the first predetermined frequency, from the waveform of the detected lateral acceleration of the vehicle; and
   determining that the vehicle is about to roll over if a state of the vehicle enters a rollover region determined by a first threshold line prescribing a relationship between the first lateral acceleration and the roll rate where the second lateral acceleration is at most a predetermined threshold, or determining that the vehicle is about to roll over if on a rollover determination map provided for each type of rollover the state of the vehicle enters a rollover region determined by a second threshold line prescribing a relationship between the second lateral acceleration and the roll rate where the second lateral acceleration is greater than the predetermined threshold.

* * * * *